US008831014B2

(12) United States Patent
Koodli et al.

(10) Patent No.: US 8,831,014 B2
(45) Date of Patent: *Sep. 9, 2014

(54) PROVIDING SERVICES AT A COMMUNICATION NETWORK EDGE

(75) Inventors: Rajeev Koodli, Sunnyvale, CA (US); Kuntal Chowdhury, Andover, MA (US)

(73) Assignee: Cisco Technology, Inc., San Jose, CA (US)

(*) Notice: Subject to any disclaimer, the term of this patent is extended or adjusted under 35 U.S.C. 154(b) by 393 days.

This patent is subject to a terminal disclaimer.

(21) Appl. No.: 12/891,636

(22) Filed: Sep. 27, 2010

(65) Prior Publication Data

US 2011/0075675 A1 Mar. 31, 2011

Related U.S. Application Data

(60) Provisional application No. 61/246,118, filed on Sep. 26, 2009, provisional application No. 61/257,712, filed on Nov. 3, 2009.

(51) Int. Cl.
*H04L 12/28* (2006.01)

(52) U.S. Cl.
USPC .......................................................... 370/401

(58) Field of Classification Search
CPC ..... H04W 92/02; H04W 36/00; H04W 88/16; H04W 92/06; H04L 45/00; H04L 45/60; H04L 12/28; H04L 12/2834
USPC ............ 370/230, 237, 217, 218, 222.01, 270, 370/279, 389, 392, 400, 401; 351/354, 356; 455/436; 709/239
See application file for complete search history.

(56) References Cited

U.S. PATENT DOCUMENTS

| 5,717,690 A | 2/1998 | Peirce, Jr. et al. |
| 5,898,713 A | 4/1999 | Melzer et al. |

(Continued)

FOREIGN PATENT DOCUMENTS

| EP | 1250022 A1 | 10/2002 |
| EP | 1587271 | 10/2005 |

(Continued)

OTHER PUBLICATIONS

International Search Report and Written Opinion issue for PCT/US2010/50418, dated Nov. 19, 2010 (14 pages).

(Continued)

*Primary Examiner* — Raj Jain
(74) *Attorney, Agent, or Firm* — Wilmer Cutler Pickering Hale and Dorr LLP

(57) ABSTRACT

As the proliferation of data rich content and increasingly more capable mobile devices has continued, the amount of data communicated over mobile operator's networks has increased. Upgrading the existing network that was designed for voice calls is not desirable or practical for many mobile operators. This disclosure relates to a mobility edge gateway that resides on the edge of the core network and can provide one or more services such as call localization, offloading of traffic, session management, and content streaming. The call localization involves identifying calls that can be maintained at the edge of the network and bridging the calls at the mobility edge gateway to bypass the core network. The offloading involves identifying traffic and offloading the traffic to the Internet or another network to bypass the core network. These services can relieve congestion on the core network of mobile operator's networks.

20 Claims, 27 Drawing Sheets

(56) References Cited

U.S. PATENT DOCUMENTS

| | | | |
|---|---|---|---|
| 6,157,649 A | 12/2000 | Peirce et al. | |
| 6,522,880 B1 | 2/2003 | Verma et al. | |
| 6,643,621 B1 | 11/2003 | Dodrill et al. | |
| 6,654,792 B1 | 11/2003 | Verma et al. | |
| 6,738,362 B1 | 5/2004 | Xu et al. | |
| 6,763,018 B1 | 7/2004 | Puthiyandyil et al. | |
| 6,917,592 B1 | 7/2005 | Ramankutty et al. | |
| 6,922,411 B1 | 7/2005 | Taylor | |
| 7,426,213 B2 | 9/2008 | Xu et al. | |
| 7,720,061 B1* | 5/2010 | Krishnaswamy et al. | 370/389 |
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 8,036,665 B2 | 10/2011 | Shah | |
| 8,064,909 B2 | 11/2011 | Spinelli et al. | |
| 2003/0028644 A1 | 2/2003 | Maguire et al. | |
| 2004/0088385 A1 | 5/2004 | Blanchet et al. | |
| 2004/0136337 A1 | 7/2004 | Warrier et al. | |
| 2004/0224678 A1 | 11/2004 | Dahod et al. | |
| 2004/0236855 A1 | 11/2004 | Peles | |
| 2005/0078691 A1 | 4/2005 | Davison et al. | |
| 2005/0091371 A1* | 4/2005 | Delegue et al. | 709/224 |
| 2005/0148368 A1 | 7/2005 | Scheinert et al. | |
| 2005/0186948 A1 | 8/2005 | Gallagher et al. | |
| 2005/0239473 A1 | 10/2005 | Pan et al. | |
| 2005/0286504 A1 | 12/2005 | Kwon | |
| 2006/0018328 A1 | 1/2006 | Mody et al. | |
| 2006/0067273 A1 | 3/2006 | Suman et al. | |
| 2006/0234678 A1* | 10/2006 | Juitt et al. | 455/411 |
| 2006/0268901 A1 | 11/2006 | Choyi et al. | |
| 2006/0291388 A1 | 12/2006 | Amdahl et al. | |
| 2007/0097983 A1 | 5/2007 | Nylander et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0183427 A1 | 8/2007 | Nylander et al. | |
| 2007/0243872 A1 | 10/2007 | Gallagher et al. | |
| 2007/0253328 A1 | 11/2007 | Harper et al. | |
| 2007/0253371 A1 | 11/2007 | Harper et al. | |
| 2008/0137541 A1 | 6/2008 | Agarwal et al. | |
| 2008/0162637 A1 | 7/2008 | Adamczyk et al. | |
| 2008/0176582 A1 | 7/2008 | Ghai et al. | |
| 2008/0188223 A1 | 8/2008 | Vesterinen et al. | |
| 2008/0298309 A1 | 12/2008 | DePietro et al. | |
| 2008/0310404 A1 | 12/2008 | Valme et al. | |
| 2008/0316980 A1 | 12/2008 | Ahlen et al. | |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0086742 A1 | 4/2009 | Ghai et al. | |
| 2009/0089447 A1 | 4/2009 | Balachandran et al. | |
| 2009/0098872 A1 | 4/2009 | Deshpande et al. | |
| 2009/0129271 A1 | 5/2009 | Ramankutty et al. | |
| 2009/0129341 A1 | 5/2009 | Balasubramanian et al. | |
| 2009/0141625 A1 | 6/2009 | Ghai et al. | |
| 2009/0156213 A1* | 6/2009 | Spinelli et al. | 455/436 |
| 2009/0196253 A1 | 8/2009 | Semper | |
| 2009/0207759 A1 | 8/2009 | Andreasen et al. | |
| 2009/0215438 A1 | 8/2009 | Mittal et al. | |
| 2009/0262682 A1 | 10/2009 | Khetawat et al. | |
| 2009/0285225 A1 | 11/2009 | Dahod | |
| 2009/0286510 A1* | 11/2009 | Huber et al. | 455/410 |
| 2009/0298470 A1 | 12/2009 | Huber et al. | |
| 2010/0027448 A1 | 2/2010 | Puthiyandyil et al. | |
| 2010/0039978 A1 | 2/2010 | Rangan | |
| 2010/0039993 A1 | 2/2010 | Ramankutty et al. | |
| 2010/0041373 A1 | 2/2010 | Ramankutty et al. | |
| 2010/0077102 A1* | 3/2010 | Lim et al. | 709/240 |
| 2010/0085978 A1 | 4/2010 | Ramankutty et al. | |
| 2010/0091653 A1 | 4/2010 | Koodli et al. | |
| 2010/0124933 A1 | 5/2010 | Chowdhury et al. | |
| 2010/0128708 A1 | 5/2010 | Liu et al. | |
| 2010/0195640 A1 | 8/2010 | Park et al. | |
| 2010/0203890 A1 | 8/2010 | Nagaraja et al. | |
| 2010/0291897 A1 | 11/2010 | Ghai | |
| 2011/0021192 A1 | 1/2011 | Grayson et al. | |
| 2011/0021196 A1 | 1/2011 | Grayson et al. | |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |

FOREIGN PATENT DOCUMENTS

| | | |
|---|---|---|
| EP | 1619917 A1 | 1/2006 |
| EP | 1978685 A1 | 10/2008 |
| GB | 2410865 | 8/2005 |
| WO | WO-2004010668 | 1/2004 |
| WO | WO-20090089455 A1 | 7/2009 |

OTHER PUBLICATIONS

International Search Report and Written Opinion issued for PCT/US2010/50427, mailed Mar. 6, 2012 (9 pages).

File History for U.S. Appl. No. 61/177,491 filed May 12, 2009, 71 pages.

3GPP TR 25.820 v8.0.0 (Mar. 2008), 3rd Generation Partnership Project; Technical Specification Group Radio Access Networks; 3G Home NobeB Study Item Technical Report (Release 8); http://www.3gpp.org, 2008. 37 pages.

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.

3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.

3GPP TS 22.220 v0.3.0 (Jul. 2008), 3rd Generation Partnership Project; Technical Specification Group Services and System Aspects; Service requireements for Home NodeBs and Home eNodeBs; (Release 9), http://www.3gpp.org, 2008. 13 pages.

3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.

3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.

3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.

3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.

3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.

3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.

3GPP TS 23.236 v. 10 Technical Specification. "3rd Generation Partnership Project; Technical Specification Group Services and Systems Aspects; Intra-Domain Connection of Radio Access Network (RAN) Nodes to Multiple Cor Network (CN) Nodes (Release 10)." Mar. 2010. 39 pages.

3GPP TS 23.236 v7.0.0 (Dec. 2006), 3rd Generation Partnership Project; Technical Specification Group Services and System Aspects;

(56) References Cited

OTHER PUBLICATIONS

Intra-domain connection of Radio Access Network (RAN) nodes to multiple Core Network (CN) nodes (Release 7); Global System for Mobile Communications, http://www.3gpp.org, 2006. 37 pages.
3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.
3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7), Global System for Mobile Communications, http://www.3gpp.org, 2007. 32 pages.
3GPP TS 25.412 v7.1.0 (Mar. 2006), 3rd Generation Partnership Project; Technical Specification Group Radio Access Network; UTRAN Iu interface signaling transport (Release 7), http://www.3gpp.org, 2006. 11 pages.
3GPP TS 25.410 v7.0.0 (Mar. 2003), 3rd Generation Partnership Project; Technical Specification Group Radio Access Network; UTRAN Iu Interface: general aspects and principles (Release 7), http://www.3gpp.org, 2006. 28 pages.
3GPP TS 25.411 v7.1.0 (Sep. 2007); 3rd Generation Partnership Project; Technical Specification Group Radio Access Network; UTRAL Iu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007. 359 pages.
3GPP TS 25.414 v7.1.0 (Sep. 2006), 3rd Generation Partnership Project; Technical Specification Group Radio Access Network; UTRAN Iu interface transport and transport signaling (Release 7), http://www.3gpp.org, 2006. 20 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.
3GPP TS 25.419 v7.0.0 (Mar. 2006), 3rd Generation Partnership Project; Technical Specification Group RAN; UTRAN Iu-BC Interface: Service Area Broadcast Protocol (SABP) (Release 7), http://www.3gpp.org, 2006. 77 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.
3GPP TS 29.234 v7.9.0 (2008-06), 3rd Generation Partnership Project; Technical Specification Group Core Network and Terminals; 3GPP system to Wirelss Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; MN Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
3GPP TS 33.234 v8.1.0 (Mar. 2008), 3rd Generation Partnership Project; Technical Specification Group Service and System Aspects; 3G Security; Wirelss Local Area Network (WLAN) interworking security (Release 8), http://www.3gpp.org, 2008. 101 pages.
3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.
3GPP TS. 23.203 v. 11.3.0 Technical Specification. "3rd Generation Partnership Project; Technical Specification Group Services and System Aspects; Policy and charging control architecture (Release 11)", Sep. 2011, 167 pages.
3GPP TS. 23.401 v. 10.5.0 Technical Specification. "3rd Generation Partnership Project; Technical Speficiation Group Services and System Aspects: General Packet Radio Service (GPRS) enhancements for Evolved Universal Terrestrial Radio Access Network (E-UTRAN) access (Release 10)." Sep. 2011, 282 pages.
3GPP TR. 23.829 v. 10.0.1 Technical Specification. "3rd Generation Partnership Project; Technical Specification Group Services and System Aspects; Local IP Access and Selected IP Traffic Offload (LIPA-SIPTO) (Release 10)." Oct. 2011, 43 pages.

\* cited by examiner

PROVIDING SERVICES AT A COMMUNICATION NETWORK EDGE

CROSS-REFERENCE TO RELATED APPLICATIONS

This application claims benefit under 35 U.S.C. §119(e) of U.S. Provisional Patent Application Nos.: 61/246,118, entitled "Providing an Offload Solution for a Communication Network", filed Sep. 26, 2009; and 61/257,712, entitled "Providing Offloads in a Communication Network", filed Nov. 3, 2009; this application also relates to U.S. patent application Ser. No. 12/891,535, entitled "Providing Offloads in a Communication Network", filed Sep. 27, 2010 each of which is hereby incorporated by reference herein in its entirety.

FIELD OF THE DISCLOSURE

This disclosure relates to a system and method for providing services at a communication network edge.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.
Overview Certain embodiments disclose a method including receiving a first packet on an interface at a gateway that is bound to or from a user equipment (UE), inspecting the first packet to obtain information regarding the packet to make an offload determination, determining if the packet meets offload criteria and upon determining that the packet is offload eligible, modifying the packet at a network address translation functionality to route traffic corresponding to the packet onto an Internet to bypass a packet core network, inspecting packets involved in establishing a call session to determine if a call is eligible to be localized at the gateway, switching identifiers of packets received in a call session at the gateway to localize the call session, and communicating information regarding the call localizing or the offloading over a channel to a home gateway.

DESCRIPTION OF EXAMPLE EMBODIMENTS

Figure 1:
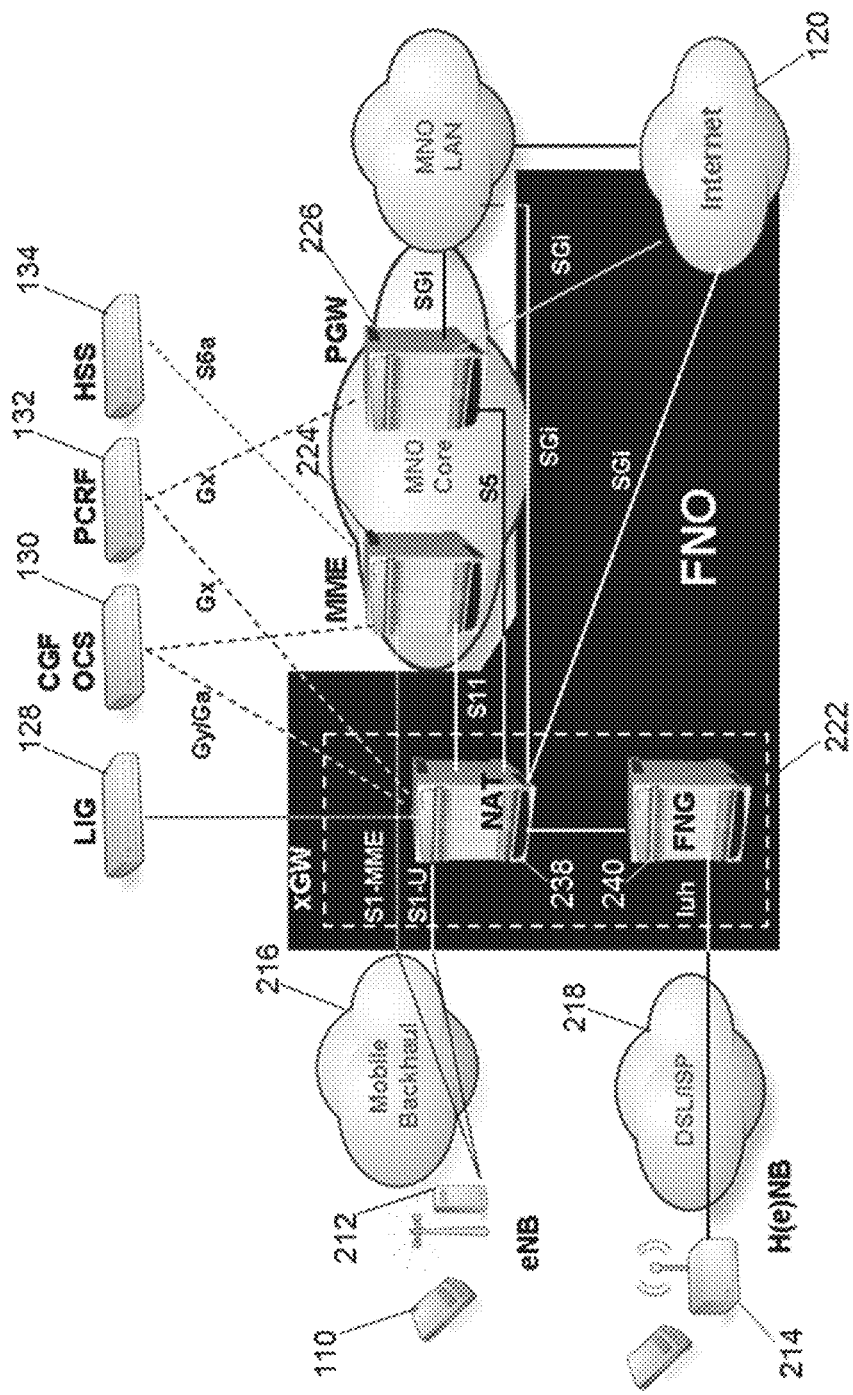
FIG. 1 is a block diagram of a communication system in accordance with certain embodiments.

The growth of mobile broadband data is straining operators existing packet core elements, increasing mobile Internet delivery cost, and challenging the flat-rate data service models. The majority of this traffic can be handled more efficiently by a new network device that provided intelligence at the edge of the network. For example, the majority of the data traffic is either Internet bound or sourced from the Internet, but is (or will be) flowing through the operator's packet core. This traffic can be offloaded at the edge to the Internet in order to remove strains from all this traffic passing through the operator's packet core. In the voice realm, many calls are made to others in a close proximity to the call originator. These calls can be localized at the edge of the network so that the voice traffic can take a shorter route that does not involve traversing the core network. The result is operators are paying more in capital and operating expenditures that can be reduced by offloading and localizing traffic so that it is not causing congestion on the operator's network.

Offloading in a Gateway

Offloading can involve interconnection and interworking between different networks and network equipment. As data is received by a gateway, this gateway can determine which data can be offloaded onto the Internet rather than being backhauled on the operator's network. The gateway can also facilitate offloading with multiple wireless transceivers in access networks, such as the macro radio access network (RAN), a femto access network, a wireless local area network (WLAN), a WiMAX network, or any other fixed-mobile convergence solution. The gateway based offload function enables Fixed Network Operators to help Mobile Network Operators (MNOs) significantly reduce their capital expenditures in expanding/upgrading the Packet Switched Core and Service LAN deployments to accommodate the exponentially growing mobile data volumes. The offload function is designed to have minimal impact to MNO's existing network architecture and design, with complete transparency to end-users, whilst improving overall end-user experience in terms of reduced end-to-end latency. The Offload Gateway can be used to relieve signaling/session capacity constraints by selectively peeling-off/terminating sessions locally.

The traffic offloading can include a traffic engineering mechanism where a portion of mobile network traffic is forwarded to and from the Internet without traversing the mobile operator's transport network and the traditional gateway. With the advances in mobile network engineering, it is now feasible to connect a Radio Access Network (RAN) with high-speed networking technologies such as Gigabit Ethernet which allow a local point of presence (POP) to the Internet. At the same time, transporting some of the mobile network traffic, such as Internet video, rich web content, via the traditional gateway is becoming both expensive and performance-limited. The offload gateway can be implemented to ensure that a) each offload gateway can be deployed seamlessly without introducing disruptions to the existing network architectures, and b) mobility of user sessions is preserved. For nomenclature, Internet traffic refers to the traffic that is offloaded without traversing the mobile operator's core network, and Home traffic refers to the traffic that is sent via the operator's core network to the home gateway. The home gateway can include a gateway that provides anchor like functionality such as a gateway GPRS support node (GGSN) or a packet data network gateway (PGW), for example.

The gateway, at a high level, implements an intelligent offload gateway (offload GW) which is capable of making intelligent decisions based on several criteria as to whether traffic is i) offloaded directly to the internet, bypassing the MNO Core and Service LAN, is ii) steered towards the MNO Service LAN, or is iii) not offloaded at all and routed back into the MNO's packet Core.

The offload GW can provide a number of functions. These include a serving gateway (SGW), a PDN gateway (PGW), an interface, an inspection module, a network address translation (NAT) functionality, and other functionalities. The interfaces can be control plane (CP) and user plane (UP) interfaces such as S1-U, S11, S5, Iuh, and SGi. This interface connectivity allows the offload gateway to intercept, capture and analyze mobile broadband data traffic. Deep Packet Inspection can be used for inspection of packet data units (PDUs) to make offload decisions based on preconfigured policy rules.

In some embodiment, a control plane (CP) module can be implemented to provide full mobility for offloaded traffic. A packet modification functionality such as a NAT functionality can be provided for routability of uplink data to the Internet as well as downlink data to the user equipment (UE). The NAT functionality can be used to modify address and other information in order to offload packets. These modifications can be to control packets so traffic selected for offload instead runs from the Internet or MNO LAN to the offload gateway. Other gateway functionalities can also be provided such as a Femto Network Gateway and Security Gateway for terminating and offloading traffic originating from Femtocells, an ASNGW for terminating and offloading traffic originating from a WiMAX RAN, or any other access gateway.

The offload gateway (OGW) can be both physically and logically located on different interfaces in the operator's network in order to provide offload services. The offload gateway inspects control plane and/or user plane traffic to make offloading decisions. In order to accomplish the offloading, the offload gateway builds state information of subscribers and correlates between UE identification information and session establishment messages. In some embodiments, a session is used to track and maintain information for a particular data connection or call. This information is obtained from performing packet assembly and parsing signaling packets/signaling transactions or from another network device. In a UMTS embodiment, the offload gateway snoops on the IuPS interface, while in LTE the offload gateway can snoop on interfaces and include the SGW within the offload gateway.

The offload gateway includes an interface to communicate with the public network or Internet. The SGi interface on the offload gateway plays the same role as on the home gateway, which is to serve as an exit/entry point to the Internet. The primary difference is that the IP packets exiting/entering the offload gateway, on this interface, include a locally allocated address instead of the home gateway allocated subscriber address as the source/destination. This modification can be performed using a network address translation functionality in order to map and substitute the information.

The Gy/Ga is a charging interface for LTE networks. The offload gateway includes the capabilities of the SGW and can provide information on the Gy interface. These capabilities allow the offload gateway to reconcile charging records that are generated by the offload gateway. The offload gateway provides the functionality to turn on charging selectively and also provides the functionality to generate either G-CDRs or S-CDRs. The Gx is the interface to the PCRF over Diameter. The offload gateway includes the capabilities of the SGW in terms of this interface and provides the functionality to function as a policy and charging enforcement function (PCEF). The Gy is the interface to the OCS over Diameter. The offload gateway includes the capabilities of the SGW in terms of this interface and can function as a PCEF.

The traffic offload solution for long term evolution (LTE) or 4G network can be achieved using an offload gateway, which can be implemented in a network device such as an xGW. FIG. 1 illustrates an LTE communication network with an offload gateway in accordance with certain embodiments. FIG. 1 includes user equipment (UE) 110, a evolved NodeB (eNB) 212, a home eNodeB (HeNB) 214, a mobile backhaul network 216, a broadband network 218, an Internet 120, an offload gateway (OGW) 222, a mobility management entity (MME) 224, a packet data network gateway (PGW) 226, a Lawful Interception Gateway (LIG) 128, a Charging Gateway Function/Online Charging System (CGF/OCS) 130, a Policy and Charging Rules Function (PCRF) 132, and a Home Subscriber Server (HSS) 134. As shown, offload gateway 222, which can be implemented on a gateway device, can include a Network Address Translation (NAT) functionality 238 and a Femto Network Gateway (FNG) 240 among other things. The offload gateway 222 can be used to interwork and interconnect with a HeNB 214 from the femto network, an eNodeB 212 from the LTE network, a MME 224 and PGW 226 on the operator's network, the Internet 120, LIG 128, CGF 130, and PCRF 132.

MME 224 is a control-node for the LTE access network. The MME 224 is responsible for UE 110 tracking and paging procedures including retransmissions. MME 224 handles the bearer activation/deactivation process and is also responsible for choosing the SGW for a UE 110 at the initial attach and at time of an intra-LTE handover. The MME 224 also authenticates the user by interacting with the HSS 134. The MME 224 also generates and allocates temporary identities to UEs and terminates Non-Access Stratum (NAS) signaling. The MME 224 checks the authorization of the UE 110 to camp on the service provider's Public Land Mobile Network (PLMN) and enforces UE roaming restrictions. The MME 224 is the termination point in the network for ciphering/integrity protection for NAS signaling and handles the security key management. Lawful interception of signaling is also supported by the MME 224. The MME also provides the control plane function for mobility between LTE and 2G/3G access networks with the S3 interface terminating at the MME 224 from the SGSN (not shown). The MME 224 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The PGW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO). The SGW or the PGW depending on the embodiment, can be used to provide deep packet inspection and provide advertising to the user on a per subscriber basis as described above on a chassis implementing a SGW or a PGW.

The offload gateway 222 can be deployed at the S1-U interface geographically close to the eNB 212, which can save the cost of backhauling the traffic on the operator's access network. The offload gateway 222, in addition to providing offload functionality, can also provide paging, charging and lawful interception functions. The offload gateway can implement bearer plane packet inspection with specific and select control plane packet inspection. The offload gateway can be used with different access networks technologies, e.g., with 2G, 2.5G, 3G (e.g., UMTS), and 4G (LTE-SAE). The offload gateway can be implemented as an SGW (denoted as SGW-xGW) and a PGW (denoted as PGW-xGW) in some embodiments. The SGW-xGW can perform a number of functions. On function includes behaving as a standard SGW towards the home PGW at the time of UE attach, in order to establish a PDN connection that results in IP connectivity. Another function includes programming the traffic rules to identify the traffic to offload to the Internet and the traffic to route to the home network. Yet another function is to establish an internal session with the PGW-xGW in order to forward traffic selected for offload.

The SGW-xGW can act as an intelligent traffic multiplexer and a demultiplexer for the Internet and Home traffic. The PGW-xGW can be a PGW which performs a NAT operation on traffic received from the SGW-xGW and a reverse NAT operation on traffic received from the Internet. This NAT operation can be performed in order to send and receive traffic to and from the Internet based on the xGW's IP network topology. When there is handover from a base station to another base station that requires xGW relocation, the PGW-xGW can act as an anchor for Internet traffic while forwarding Home traffic to the SGW-xGW. In this case, the PGW-xGW acts as a traffic multiplexer and demultiplexer for handover sessions. In some embodiments, the xGW is a specialized node that performs traffic offload to the Internet using sophisticated rules, while seamlessly co-existing with the other elements in the LTE/SAE architecture.

Figure 2:
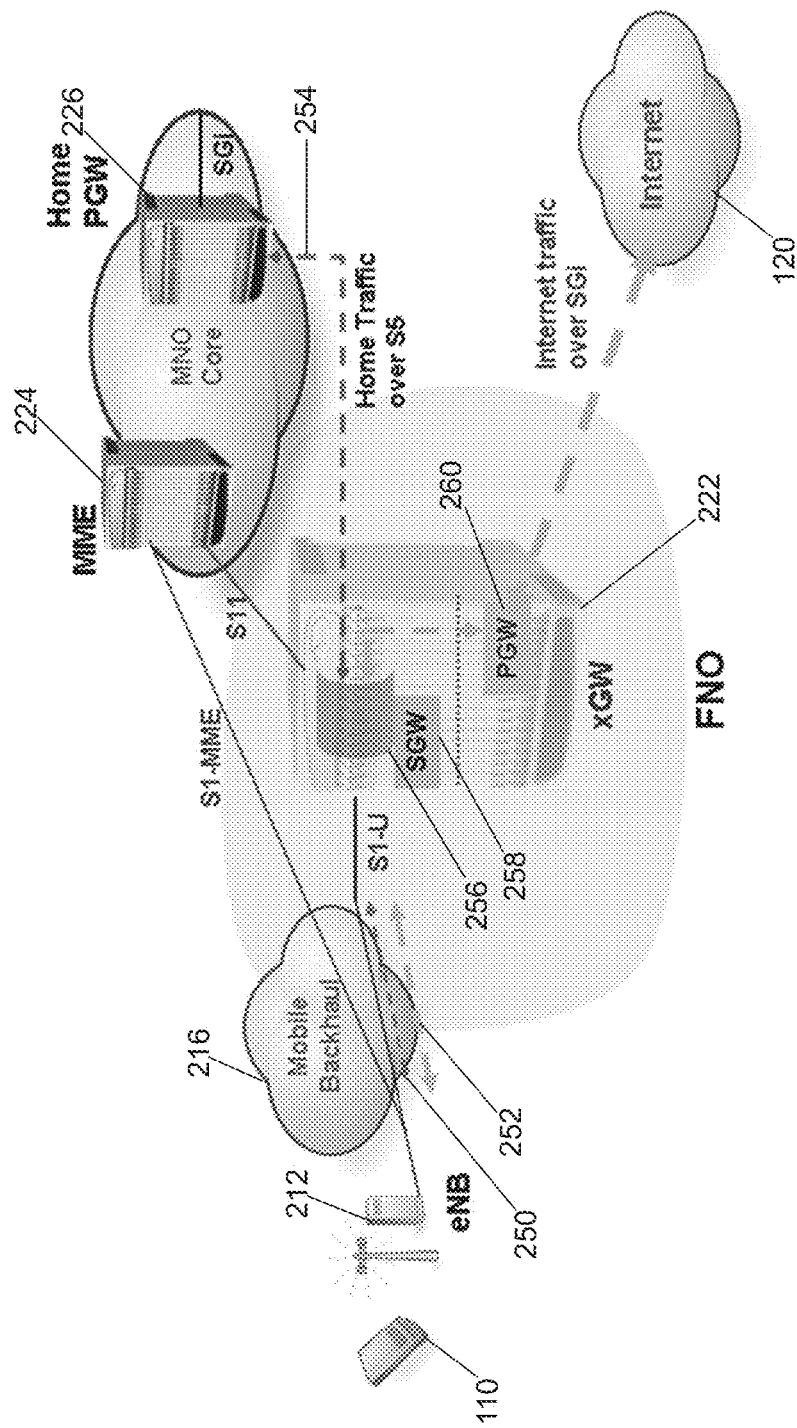
FIG. 2 is a block diagram illustrating offloading at an offload gateway in accordance with certain embodiments.

FIG. 2 illustrates operation of an offload gateway in some embodiments. In operation, the user equipment 110 can communicate with eNB 212 wirelessly though an radio interface. The eNB 212 can convert the wireless communication to wired-based communication over a communication network. The communications between the UE 110 and eNB 212 include access network traffic and Internet traffic. The access traffic can include control information, voice over IP (VoIP) packets, packetized voice, QoS-based data service, text messaging, and data sent or received from another mobile device. The Internet traffic includes data the originates or terminates on the Internet such as video, music, web content, or games. The Internet traffic is typically traffic that ends up being sent to the Internet after passing through the operator's core packet network. A traffic rules function 256 includes traffic rules that are used to identify the traffic that is offloaded to the Internet. The offload gateway 222 can also setup an internal session to forward selected traffic for offload. The traffic rules function 256 can be implemented in conjunction with an SGW function 258 and can communicate with a PGW 260. The traffic rules function 256, SGW function 258, and PGW 260 can be implemented as modules that are stored in whole or part in memory and are run on at least one processor. The implementation of offload gateway is further described below. The internal session can send the traffic to a PGW function that sends the traffic over an SGi interface to the Internet.

Figure 3:
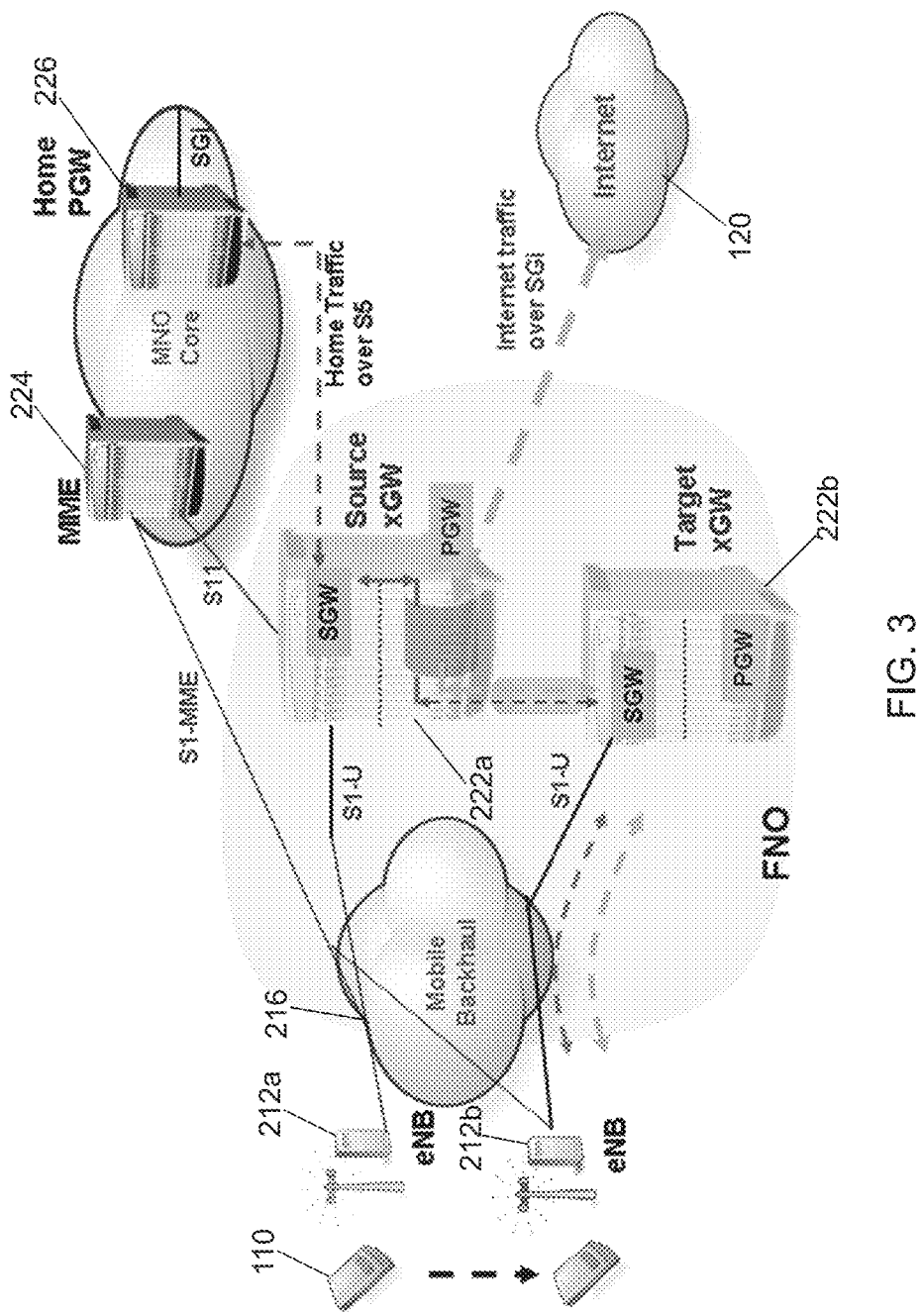
FIG. 3 is a block diagram illustrating a handover between offload gateways in accordance with certain embodiments.

FIG. 3 illustrates a handover from a first offload gateway to a second offload gateway in accordance with certain embodiments. As shown, UE 110 moves from the radio coverage of eNB 212a to the radio coverage of eNB 212b. In some embodiments, access network traffic and the Internet traffic can be tunneled between a target offload gateway 222b and source offload gateway 222a. The tunneling can be implemented to prevent any disruption in service when UE 110 is roaming. In some implementations, traffic can be re-directed between the source offload gateway 222a quicker than the establishment of sessions and communications within an offload gateway. While the access network traffic and Internet traffic are being tunneled between the source offload gateway 222a and the target offload gateway 222b, the target offload gateway 222b can setup the sessions to take over the offloading and offload determinations of the traffic. When offload gateway 222b is setup, the forwarding of the traffic between target gateway 222b and the source gateway 222a can be discontinued, and the target gateway 222b can handle the offloading of Internet traffic.

A number of features are implemented in the offload gateway. For example, the offload gateway provides seamless operation within the standard LTE EPC architecture. The offload gateway, xGW, does not introduce changes to the existing nodes in the LTE EPC architecture while providing the traffic offload service. This allows operators to introduce the offload service without having to disrupt the existing architecture or change the existing network topology to provide offloading functionality in the network. The offload gateway provides sophisticated operation at the flow granularity. The offload gateway can be configured using a Command Line Interface or programmed via a policy interface (PCRF) to selectively offload traffic (such as utube video) while forwarding other traffic (such as IMS multimedia) via the operators core network. An operator can specify exactly which kind of traffic is offloaded directly to the Internet and which kind of traffic is sent via the home network. The offload gateway can offload traffic without requiring new IP address or prefix pools. The offload gateway can operate on already assigned addresses or prefixes allowing operators to conserve address management and routing. At the same time, the offload gateway can provide IP pool management as well as specialized APN service if the operator so decides. The offload gateway can also provide transparent mobility management. In the LTE/SAE architecture, the MME manages the mobility of the User Equipment (UE). In some embodiments, the MME continues to manage the UE mobility without being aware of some traffic being offloaded to the Internet. The mobility of offloaded traffic is ensured by anchoring those sessions at the offload gateway, xGW. Information can be provided from the offload gateway to the MME to allow the MME to continue managing the mobility of the UEs.

In some embodiments, the xGW can be related to the other network nodes in the following way. From the perspective of the MME, the offload gateway can be an xGW that is a combined PGW and SGW. When xGW relocation happens due to, e.g., eNodeB handovers, the MME treats the xGW as an SGW. For notation, SGW-xGW can be to denote an SGW collocated with the xGW and PGW-xGW can be used to denote the PGW collocated with the xGW. In the collocated xGW, the MME selects this combined node based on APN configuration or PGW-FQDN configuration in the HSS on a per-subscriber basis. This allows an operator to configure the service at the time of user attachment to the network. The MME uses an S11 interface to communicate towards the SGW-xGW in the combined node. The MME provides the SGW-xGW's F-TEID for IP address and TEID to the eNB over S1-MME for bearer traffic. The MME manages the X2 and S1 interface mobility with the SGW-xGW. The MME manages idle mode mobility and paging with the SGW-xGW.

From PGW perspective for this combined offload gateway, the xGW is an SGW. The traffic that is not off-loaded can be sent by the xGW to the PGW over S5/S8. The PGW can receive S5/S8 control-plane signaling that is forwarded by the xGW. This can include, for example, ULI from the MME that may be sent to the PGW depending on the policy. If there is an xGW relocation, traffic continues to be anchored at the source xGW (which implies the relocation is transparent to the PGW). Alternatively, xGW relocation can also be treated as SGW relocation. From the perspective eNB, xGW is an SGW. The xGW can terminate the S1-U GTP-U tunnel carrying bearer traffic.

In some embodiments, the introduction of the xGW is transparent to the other elements in the EUTRAN and EPC. This transparency can be the result of providing internal functions and sessions to manage the mobility and process the data at the edge of the network. The mobility management and processing can allow offloading at the edge in a way that is non-disruptive to the existing network topology and does not require modification to other network devices in the network topology. For example, the offload gateway (xGW) can perform Network Address Translation (NAT) using the IP addresses assigned by the PGW for traffic which is offloaded to the Internet. For the traffic that is not offloaded, the offload gateway (xGW) can forward the traffic to the PGW just as an SGW would. The xGW may perform IP address assignment on its own in case of PDN connection termination by the xGW, i.e. S5/S8 connection to another PGW may not occur. In this case, there is no NAT required. The following sections describe the operation of the xGW for procedures such as attachment to the network, mobility in active and idle modes as well as detachment from the network.

The offload traffic rules logic and internal session can be implemented in software using a computer readable medium such as a programmable read only memory (PROM) or flash memory. The logic may also be implemented in hardware using an application specific integrated circuit (ASIC), programmable logic array (PLA), or any other integrated circuit. The logic and session can be implemented using registers in a combination of hardware or software, or in microcode, for example. The registers can be used to implement databases that are processed using a processor such as a network processing unit.

Figure 4:
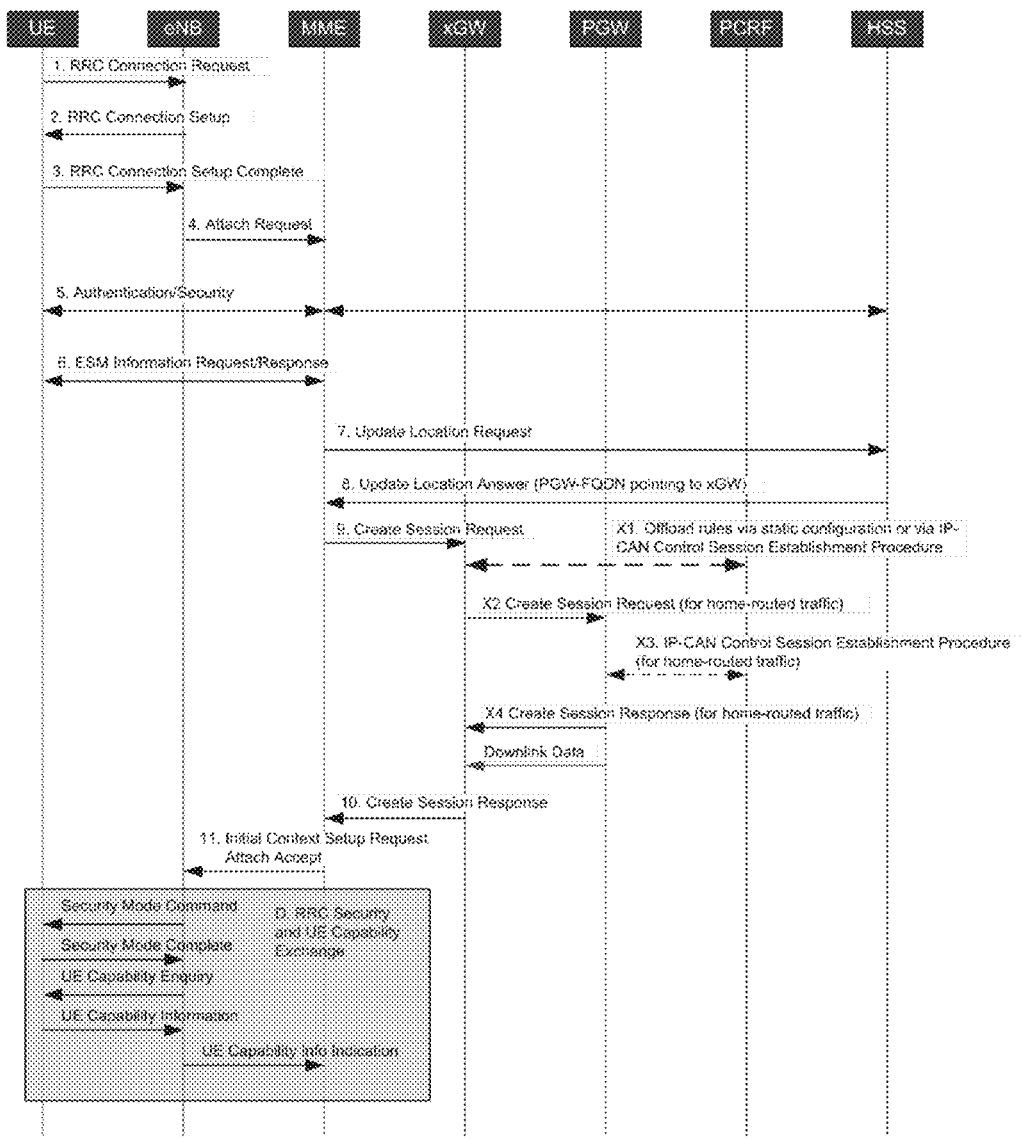
FIGS. 4-5 is a call flow diagram of an UE attach in accordance with certain embodiments.
Figure 5:
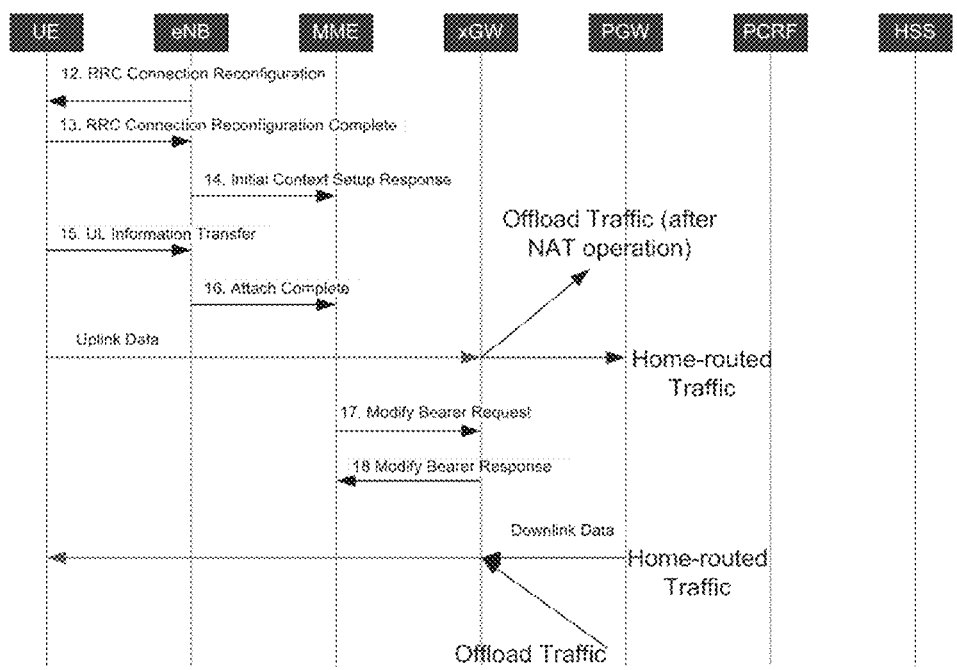

FIGS. 4-5 illustrate a call flow diagram of an UE attach in an LTE network in accordance with some embodiments. In steps 1 and 2, a radio resource control (RRC) connection request/connection setup messaging is exchanged to set up an RRC connection. In step 3, a RRC connection setup complete message is sent from the UE to the eNB. The RRC connection setup complete message can include parameters such as the PLMN-ID and NAS [Attach Request]. The attach request can further include information such as Protocol Discriminator, Security Header Type, Attach Request Message Identity, EPS Attach Type, NAS key set identifier, IMSI, UE network Capability, ESM Message Container, [PDN Connectivity Request ( )]. This information is included in the NAS-dedicated information in the RRC Connection Setup Complete message. The message can also include a PDN Connectivity Request, which can include the following information: Protocol Discriminator, EPS Bearer Identity, Protocol Transaction Identifier, PDN Connectivity Request Message Identity, Request Type, PDN Type [IPv4v6], protocol configuration option (PCO), ESM Information transfer flag (optional if the UE wants to transfer APN). In step 4, the eNodeB selects the MME and forwards the Attach Request message in an Initial UE Message to the MME. The Initial UE message can include the following information: Message Type, eNB UE S1AP ID, NAS-PDU, TAI, ECGI), RRC Establishment cause. The NAS PDU includes the Attach Request message, which also includes the PDN Connectivity Request message in the ESM Container. The MME makes use of the IEs in these two messages when sending Create Session Request message below.

In step 5, authentication/security information is exchanged. In the case of initial attach when there is no UE context on the network, authentication is performed. The MME sends an authentication information request to the HSS and receives an authentication information answer that is used to send an authentication request message to the UE. The authentication request message can include parameters such as Protocol Discriminator, Security Header Type, Authentication Request Message Type, NAS key set identifier-ASME, Half octet spare, Auth parameter RAND, Auth Parameter AUTN. The UE sends an authentication response message to the MME. The authentication response message can include parameters such as Protocol Discriminator, Security Header Type, Authentication response message type, Authentication response parameter. In order to establish a NAS Security context, the MME sends a security mode command message to the UE. The security mode command message can include parameters such as Protocol Discriminator, Security Header Type, Security mode command message identity, Selected NAS security algorithms, NAS key set identifier ASME, replayed UE security capabilities, and IMEISV Request. In some embodiments, the message's integrity can be protected using Kasme. The UE responds by sending a security mode complete message to the MME. The security mode complete message can include parameters such as Protocol Discriminator, Security Header Type, Security mode complete message identity, IMEISV.

In step 6, the MME sends an ESM Information Request message to the UE if ESM Information transfer flag is set in the PDN Connectivity Request (step 3 above). The ESM Information Request message can include parameters such as Protocol Discriminator, EPS Bearer Identity, Procedure Transaction Identity, ESM Information request message identity. The UE responds with ESM Information Response to the MME. The ESM Information Response message can include information such as Protocol Discriminator, EPS Bearer Identity, Procedure Transaction Identity, ESM Information response message identity, and access point name. In step 7, the MME sends an update location request message to the HSS. The update location request message can include parameters such as User Name, ULR Flags, Visited PLMN ID, RAT Type. In certain embodiments, the User Name can be set to the IMSI of the UE.

In step 8, the HSS replies with update location answer message. The update location answer message can include information such as Result, ULA-Flags, Subscription Data [MIP6-Agent-Info AVP], MSISDN, PDN Type [IPv6]. ULA-Flags and Subscription Data are present when the Result is Success. The Subscription Data includes the profile for the subscribed APNs. The PGW-FQDN is mapped to the xGW when offload is configured for the APN and the user. In step 9, the MME resolves the supplied PGW-FQDN which maps to the combined PGW/SGW node. This provides for node selection on the MME (i.e., to select the combined PGW/SGW node). The MME sends a create session request message to the offload gateway. The create session request message can including information such as IMSI, MSISDN, MEI, ULI, Serving Network, RAT Type, Indication Flags, Sender F-TEID for control-plane, PGW Address for control-plane or PMIP, APN, Selection Mode, PDN Type [IPv6], PDN address allocation (PAA), Maximum APN Restriction, APN-AMBR, PCO (DNS and P-CSCF addresses), Bearer Contexts [EBI, Bearer QoS, Charging Characteristics]. The RAT Type can be set to EUTRAN and the Indication Flag can have the S5/S8 Protocol Indicator set to GTP. The PDN Type is based on the subscription record received from the HSS and the PDN Type information provided by the UE. The PDN Type field in the PAA is the same as the PDN Type information element (IE). IPv6 Prefix and Interface Identifier can be set to ALL-ZERO for PDN Type IPv6. If static assignment is used, the corresponding addresses are used.

In step X1, the create session request is processed by the xGW, which may contact the PCRF for initializing policy rules. IP-CAN Session Establishment steps take place this at this stage between xGW and PCRF for the offload traffic. See step X3 below for the information elements. In step X2, the SGW-xGW derives APN-FQDN from the APN. This APN-FQDN is resolved to the home PGW using the namespace (DNS) or via a local configuration. The xGW sends a create session request message to the PDN GW in order to establish the new connection. The create session request message can include information such as IMSI, MSISDN (as received on S11 interface), MEI, ULI, Serving Network, RAT type, Indication Flags, Sender F-TEID for Control Plane, APN, Selection Mode, PDN Type, PDN Address Allocation, Max APN Restriction, APN-AMBR, PCO (DNS and P-CSCF addresses), Bearer Contexts to be Created [including: EPS Bearer ID, Bearer Level QoS, Charging Characteristics, S5/8-U SGW F-TEID], and recovery (conditional on first time contact). The radio access type (RAT) type is E-UTRAN.

In step X3, the PGW can initiate an IP-CAN session establishment procedure for home-routed traffic. The PCEF sends a CC-Request (CCR) Command with CC-Request-Type set to INITIAL_REQUEST and the command can include the following attributes: Default-EPS-Bearer-QoS, AN-GW-Address, Called-Station-Id (APN-Name), [Event-Report-Indication], 3GPP-User-Location-Info, IP-CAN Type, RAT Type, Framed-IPv6-Prefix, Subscription-Id (IMSI), Access-network-Charging-identifier-Gx, Offline, Network-Request-Support, [QoS-Information] User-Equipment-Info, Subscription-Id and base AVP's. The subscribed APN-AMBR is included in the QoS-information AVP. On receiving the CCR the PCRF sends a CC-Answer (CCA) Command to install the PCC rules and event triggers. CCA includes the following AVPs: Default-EPS-Bearer-QoS, Bearer-Control-Mode, [Event-trigger (subscribe to user location change (eCGI or/and TAI (Event-Trigger=USER_LOCATION_CHANGE (13)), subscribe to serving gateway change (Event-Trigger=AN_GW_CHANGE (21)), subscribe to OUT_OF_CREDIT (15), subscribe to REALLOCATION_OF_CREDIT (16)), subscribe to IP-CAN_CHANGE (7), subscribe to RAT_CHANGE (2), subscribe to PLMN_CHANGE (4), subscribe to QOS_CHANGE (1), subscribe to DEFAULT_EPS_BEARER_QOS_CHANGE (20)], [QoS-information], and Charging-rule-install are subject to use case. The QoS-Information AVP contains authorized APN-AMBR. The Charging-rule-install includes the rule required to create the dedicated bearer for SIP signaling.

In step X4, the PGW responds with a create session response message for home routed traffic. The create session response message includes parameters such as Cause, PGW S5 Address Control Plane (F-TEID), PDN Address Allocation, APN Restriction, APN-AMBR, PCO (DNS and P-CSCF addresses), Bearer Contexts Created [including information such as EPS Bearer ID, S5/8-U PGW F-TEID, Cause, UL TFT, DL TFT (both optional), Bearer Level QoS (optional), Change Reporting Action, Charging ID], Recovery (if contacting for first time) message to the Serving GW (component in the xGW). The PDN GW provides IPv6 Prefix for use with the UE.

In step 10, the xGW sends a create session response message to the MME. The create session response message includes parameters such as Cause, Sender F-TEID for C-plane, PGW S5/S8 Address C-plane, PAA (PDN type set to IPv6), APN-AMBR, PCO (DNS and P-CSCF addresses), APN Restriction, Bearer Contexts Created [including: EPS Bearer ID, Cause, UL TFT, DL TFT (both optional), S1-U SGW F-TEID, Bearer Level QoS (optional), Charging ID]. In step 11, the attach accept is sent as a NAS PDU in the initial context setup message from MME to eNodeB. The initial context setup message includes information such as Message Type, MME UE S1AP ID, eNB UE S1AP ID, UE-AMBR, E-RAB to be Setup List [including, e.g., E-RAB ID, E-RAB Level QoS parameters, Transport Layer Address, GTP TEID, NAS-PDU], UE Security Capabilities, and a security key. The attach accept message can include a new GUTI as well as information such as Protocol Discriminator, Security Header type, Attach accept message identity, EPS attach result, Spare half octet, T3412 value (GPRS timer), TAI list, ESM message container [Activate Default EPS Bearer Context Request]. The Activate Default EPS Bearer Context Request message can include the following information elements (IEs): Protocol Discriminator, EPS bearer identity, Procedure transaction identity, Activate Default EPS Bearer Context Request message identity, EPS QoS, APN and PDN Address. In the box labelled D, security procedures and capabilities of the network devices are exchanged. The includes exchanging security mode command messages and messages regarding UE capabilities. The UE capability information is passed from the UE to the MME.

FIG. 5 illustrates a continuation of FIG. 4 including steps 12 to 18. In step 12, the eNodeB sends the RRC Connection Reconfiguration message including the EPS Radio Bearer Identity to the UE, and the Attach Accept message to the UE. The RRC connection reconfiguration message can include information such NAS-dedicated information and radio resource configuration information. Access point name (APN) information is provided to the UE to notify it of the APN for which the activated default bearer is associated. The APN identifies an IP packet data network (PDN) for communication with the UE. In step 13, the UE sends the RRC connection reconfiguration complete message to the eNodeB. In step 14, the eNodeB sends an initial context setup response message to the MME. The initial context setup response message includes parameters such as Message Type, MME UE S1AP ID, eNB UE S1AP ID, E-RAB Setup List, E-RAB Identity, Transport Layer Address, GTP TEID. In step 15, the UE sends an uplink information transfer message. This message includes the attach complete information that is used by the eNB. This attach complete information in the uplink information transfer message includes information such as Protocol Discriminator, security header type, attach complete message identity, and an ESM message container. The ESM message container includes the activate default EPS bearer context accept message that includes information such as protocol discriminator, EPS Bearer Identity, procedure transaction identity, and Activate Default EPS Bearer Context Accept message identity.

In step 16, the eNodeB forwards the received attach complete message in an Uplink NAS Transport message as part of NAS PDU. The Uplink NAS transport message can include information such as Message Type, MME UE S1AP ID, eNB UE S1AP ID, NAS-PDU, E-UTRAN CGI, TAI. The attach complete message includes the information discussed above for step 15. The UL Transfer message sent from the UE to the eNB includes the Attach Complete message. However, the UL Transfer message terminates at the eNB, which then encapsulates the Attach Complete message in Uplink NAS Transport message and sends it to MME. After this step, uplink traffic can be sent either directly to the Internet after performing NAT operation, or is sent to the PGW depending on the established offload rules. The uplink traffic that is sent directly to the internet is offload traffic that is offloaded rather than being carried on the MNO's network (home-routed traffic). The traffic that is not offloaded to the Internet is sent to the PGW.

In step 17, the MME sends a modify bearer request message to the xGW. The modify bearer request message include information such as Bearer Contexts to be modified, which further includes EPS Bearer ID; S1 eNB F-TEID; Bearer Level QoS (optional). The modify bearer request message establishes the S1-U tunnel parameters at the xGW towards the eNodeB. In step 18, the SGW function of the xGW sends a modify bearer response message to the MME. This modify bearer response message includes parameters such as Cause, Bearer Contexts Modified [further including: EBI, Cause, S1 SGW F-TEID]. The S1 SGW F-TEID is the same as the S1-U SGW F-TEID sent in Create Session Response from the SGW to the MME. At this point, the xGW can forward any arriving traffic either directly from the Internet or from the PGW to the UE. Traffic that is received directly from the Internet is offload traffic that is processed by the offload gateway, xGW, and forwarded to the UE.

Figure 6:
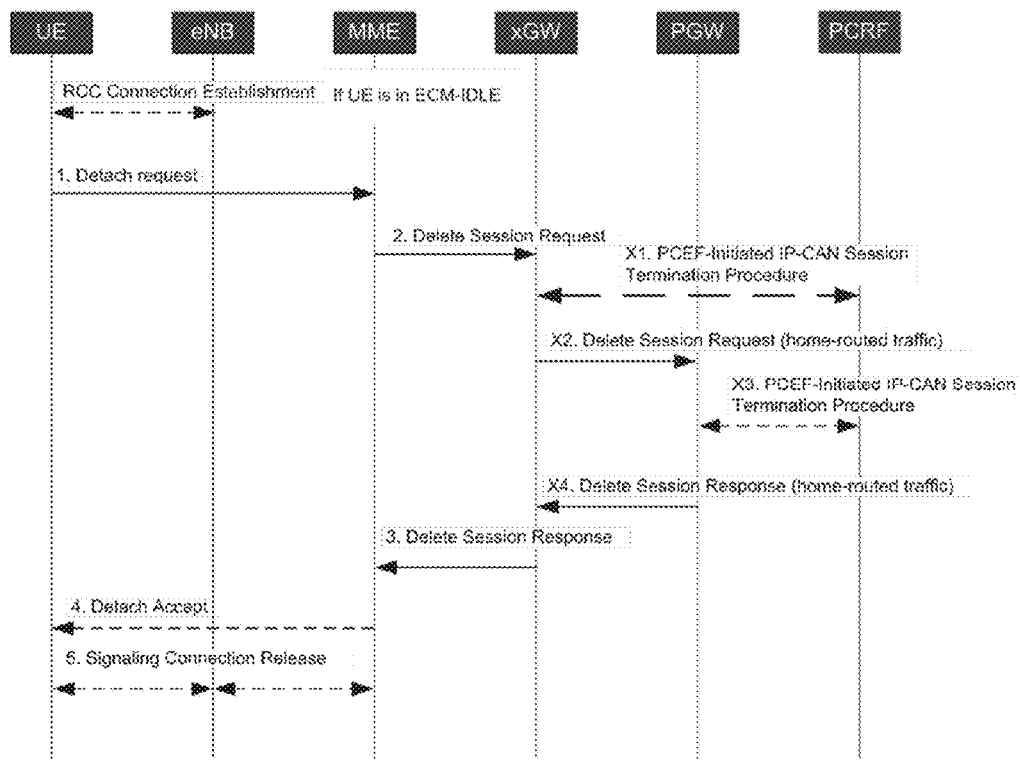
FIG. 6 is a call flow diagram of a UE-initiated detach procedure in accordance with certain embodiments.

FIG. 6 illustrates a UE-initiated Detach procedure in accordance with certain embodiments. In step 1, the UE sends a NAS message, specifically a detach request message to the MME. The detach request message includes parameters such as Protocol Discriminator, Security Header type, Detach request message identity, Detach Type, Half octet spare, and a GUTI. The eNodeB forwards this NAS message to the MME along with the TAI+ECGI of the cell, which the UE is using as an Uplink NAS Transport message. If the use case is a UE-initiated detach from an idle mode, then the detach message is carried by the RRC connection setup complete message on the Uu interface and by the Initial UE Message on the S1 interface. If the use case is a UE-initiated Detach from a connected mode, then the detach message is carried by the uplink (UL) information transfer message on the Uu interface and by the UL NAS transport message on the S1 interface.

Steps 2 to 5 are performed for each active packet date network (PDN) with which the UE has an established session. In step 2, the MME sends a delete session request message to the xGW. The delete session request message can include parameters such as LBI, ULI, Indication Flags [e.g., Operation Indication=1]. Typically, no modify session request is sent if the UE is emerging from idle mode.

In step X1, the xGW performs PCEF-initiated IP-CAN session termination procedure with the PCRF. In step X2, the xGW sends a delete session request message to the PGW to delete the session at the PGW. The delete session request message can include parameters such as a linked bearer identity (LBI) and ULI. In step X3, the PGW sends a CC Request (CCR) message with CC-Request-Type AVP set to TERMINATION_REQUEST. The PCRF responds with CC Answer (CCA) message. In step X4, the PGW sends delete session response message including cause information to the SGW function on the offload gateway (xGW).

In step 3, the xGW sends the delete session response message with the cause information to the MME. In step 4, the MME sends the detach accept message to the UE if Switch-off is not indicated in the detach request message. The detach accept message can include can include parameters such as Protocol Discriminator, Security header type, and Detach accept message identity. In step 5, the MME sends UE context release command message to the eNB. The UE context release command message includes parameters such as Message Type, UE S1AP ID pair, MME S1AP ID, and cause. The eNB sends RRC connection release to UE. The eNB responds to the MME with UE context release complete message releasing the S1 connection between eNB and MME for the UE. The UE context release complete message can include information such as Message Type, MME UE S1AP ID, eNB UE S1AP ID.

Figure 7:
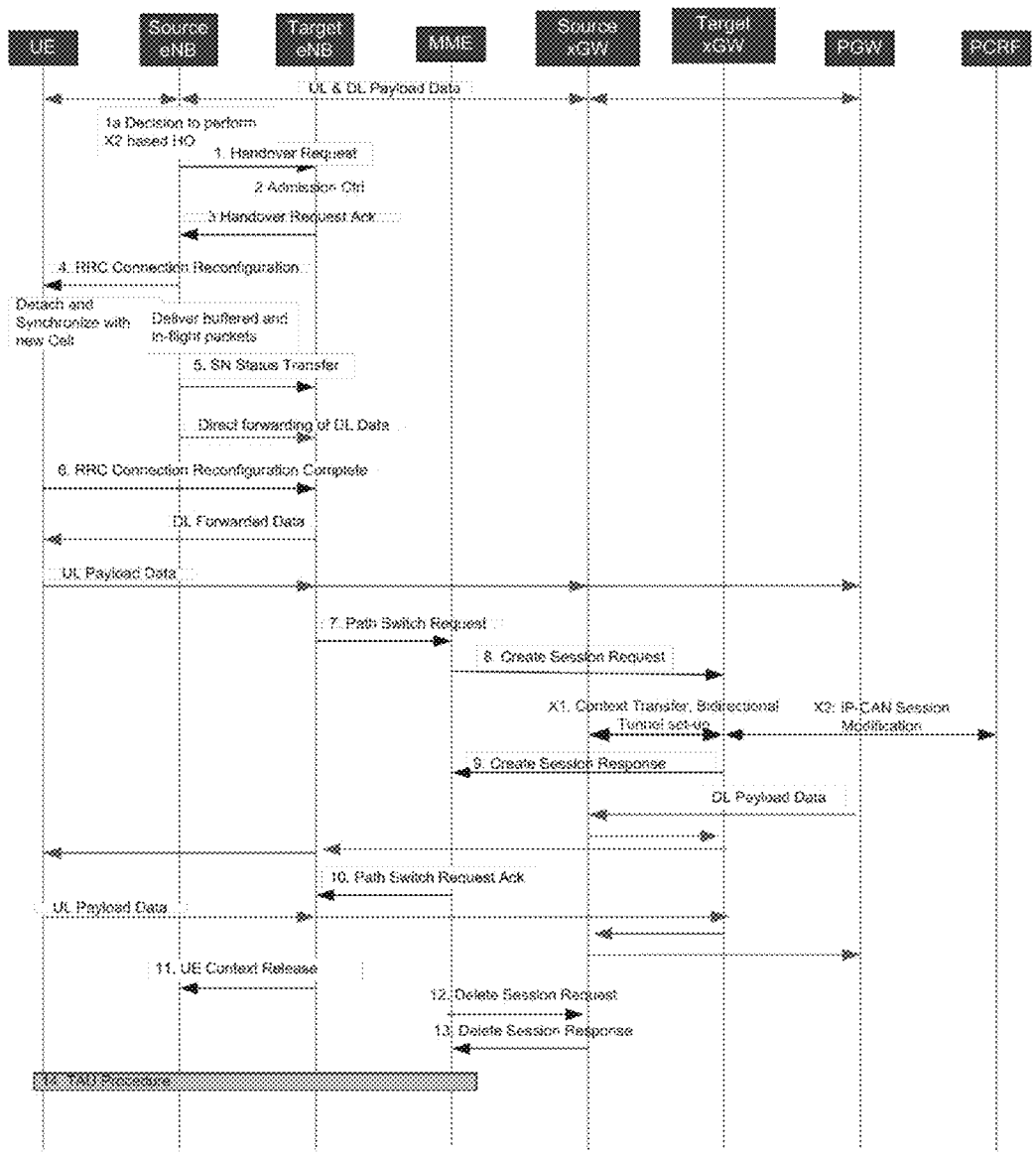
FIG. 7 is a call flow diagram of an offload gateway handover in accordance with certain embodiments.

The X2-based handover is the most common handover in EUTRAN involving an eNodeB change. When there is no xGW relocation, the current xGW continues to serve the UE traffic without any additional procedures. FIG. 7 illustrates an xGW relocation call flow in accordance with certain embodiments. In step 1, Source eNB sends Handover Request message to target eNB. The handover request message can include parameters such as Message Type, Old eNB UE X2AP ID, Cause, Target Cell ID, GUMMEI, UE Context Information [including: MME UE S1AP ID, UE Security Capabilities, AS Security Information, UE AMBR], E-RAB To Be Setup List [including E-RAB To Be Setup Item [E-RAB ID, E-RAB Level QoS Parameters, DL Forwarding, UL GTP TEID], RRC Context, and Location Reporting Information]. In step 2, admission control is performed by a target eNB. The target eNB configures the resources according to the received EPS bearer QoS information and reserves a C-RNTI and optionally a RACH preamble.

In step 3, the target eNB sends handover request acknowledge to the Source eNB. The handover request acknowledge can include information such as Message Type, Old eNB UE X2AP ID, New eNB UE X2AP ID, E-RABs Admitted List [including E-RAB Admitted Item [E-RAB ID, DL GTP TEID]], and Target eNB To Source eNB Transparent Container [Handover Command]. In step 4, Source eNB sends a RRC connection reconfiguration message containing the handover command received from the Target eNB. With RRC connection reconfiguration message, the UE receives parameters (e.g., new C-RNTI, target eNB security algorithm identifiers, and optionally dedicated RACH preamble, target eNB SIBS, etc). At this point, the UE can detach from the Source eNB and synchronize with the Target eNB, while the Source eNB delivers buggered and in-flight packets. In step 5, Source eNB sends SN Status Transfer message to target eNB to convey the uplink PDCP SN receiver status and the downlink PDCP SN transmitter status of EPS bearers for which PDCP status preservation applies. The SN Status Transfer message can include information such as Message Type, Old eNB UE X2AP ID, New eNB UE X2AP ID, E-RABs Subject To Status Transfer List [including E-RABs Subject To Status Transfer Item [E-RAB ID, UL Count Value, DL Count Value]]. After sending the SN status transfer message, the Source eNB can start forwarding downlink data towards target eNB for bearers at the Source eNB that are subject to data forwarding.

In step 6, after the UE has successfully synchronized to the target cell or eNB, the UE sends a RRC connection reconfiguration complete message to target eNB. Downlink packets forwarded from source eNB can be sent to UE. Also, uplink packets can be sent from UE, which are forwarded to S-GW and to P-GW. In step 7, Target eNB sends a Path Switch Request message to the MME to inform the MME that the UE has changed cells or eNBs. The path switch request message can include information such as Message Type, eNB UE S1AP ID, E-RAB To Be Switched in Downlink List [including E-RABs Switched in Downlink Item IEs [E-RAB ID, Transport layer Address, GTP-TEID]], Source MME UE S1AP ID, E-UTRAN CGI, TAI, and UE Security Capabilities.

In step 8, the MME selects a new SGW co-located with the xGW. For this, the SGW selection based on TAI-FQDN can ensure that the order in the naming authority pointer (NAPTR) records for the new SGW-xGW is lower than for all other SGWs that serve the TAI. If the order value is the same, then the preference value for the new SGW-xGW is the lowest. The lower order and preference values ensure that the MME selects the SGW-xGW for traffic offload during relocation. The MME sends a create session request message to the Target xGW with information in order to establish a new session with the Target xGW. The create session request message can include parameters such as IMSI, ULI, Serving Network, RAT Type, Indication Flags, Sender F-TEID for C-plane, PGW Address for control-plane or PMIP, APN, PDN Type, Maximum APN Restriction, LBI, Bearer Contexts [including EBI, S1-U eNB F-TEID, S5/S8-U PGW F-TEID, Bearer QoS, and Charging ID].

In step X1, using the PGW Address for the control plane information element (IE), the Target xGW contacts the Source xGW (specifically PGW-xGW) for establishing a new tunnel. The PGW-xGW internally queries the SGW-xGW in order to obtain the traffic rules for the Internet and Home traffic. The Internet traffic being packets and data streams that are offloaded via the Internet. Subsequently the PGW-xGW begins to act as a traffic multiplexer and demultiplexer. However, any incoming traffic from the new xGW meant for home (e.g., the MNO's core network) is routed via the SGW-xGW in the source xGW. This makes the Home PGW believe that there is no handover at all. As a result of this step, the session is still anchored at the Source xGW. However, the source xGW forwards the downlink packets to the Target xGW via the bidirectional tunnel. Similarly, the Target xGW forwards the uplink packets to the Source xGW via the bidirectional tunnel. By doing this, the Source xGW can maintain the NAT state and ensure session continuity.

In step 9, the xGW sends a create session response message to MME. The create session response message can include information such as Cause, Sender F-TEID for Control Plane, APN Restriction, and Bearer Contexts Created [further including EPS Bearer ID, Cause, S1-U SGW F-TEID]. If the optional bridge is enabled, then the downlink payload data can flow from the PGW to the Source xGW and the Source xGW can tunnel the data to the Target xGW. The Target xGW can then send the data to the Target eNB, which communicates the data to the UE. In step 10, the MME confirms the path switch request message (step 7) with the path switch request acknowledge message to the target eNB. The path switch request acknowledge message can include information such as Message Type, MME UE S1AP ID, eNB UE S1AP ID, Security Context, UE-AMBR (Optional), and E-RAB To Be Switched in Uplink List.

If the optional tunnel is enabled, then after the path switch request acknowledgement message is received by the Target eNB, upload data can be communicated from the UE through the tunnel and the Target and Source xGWs. The flow of data is from the UE to the Target eNB, from the Target eNB to the Target xGW, from the Target xGW to the Source xGW through the tunnel, and then from the Source xGW to the PGW. At this point, both uplink and downlink data is being communicated over the tunnel between the Source offload gateway and the Target offload gateway. If the tunnel is not enabled, then the Target xGW begins sending data directly to the PGW. In step 11, by sending UE context release message, the target eNB informs success of handover to the Source eNB and triggers the release of resources. The UE context release message can include information such as Message Type, Old eNB UE X2AP ID, and new eNB UE X2AP ID.

In step 12, if there are active bearer contexts for the UE, the old MME sends a delete session request message to the source xGW. The delete session request message can include information such as linked bearer identity (LBI) and Indication Flags. The operation indication flag may not be set. In step 13, the Source xGW sends delete session response with cause information to the MME. Before the session is deleted from the Source xGW, the tunnel is torn down and the Target xGW begins communications directly with the PGW. If the optional tunnel is not setup, then uplink and downlink data passes directly from the Target xGW to the PGW. In step 14, the UE initiates a Tracking Area Update (TAU) procedure when one of the conditions for triggering a tracking area update applies. The MME can perform a subset of the TA update procedure by excluding the context transfer procedures between source MME and target MME.

Figure 8:
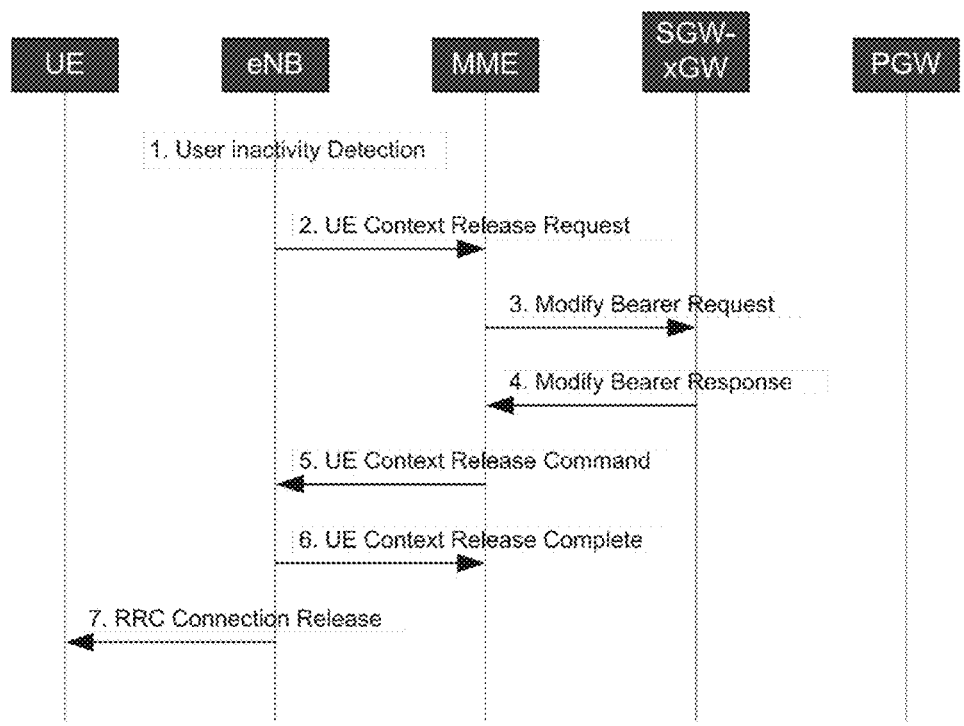
FIG. 8 illustrates an active to idle UE transition in accordance with certain embodiments.

FIG. 8 illustrates when the UE transitions from active to idle in accordance with some embodiments. The UE transitions to idle when there is no activity with the network for a preconfigured amount of time. The transition to idle can release radio resources back to the network and conserve power on the UE. In step 1, inactivity is detected for the user of the UE. In step 2, the eNodeB requests the MME to release the UE Context in the eNodeB, by sending the UE Context Release Request message with the cause "user inactivity", to the MME. The UE Context Release Request message can include information such as Message Type, MME UE S1AP ID, eNB UE S1AP ID, and cause. In step 3, the MME informs the SGW-xGW that the UE is not available for downlink (DL) traffic by sending a release access bearers request message to the SGW. In step 4, the SGW-xGW releases the S1-U eNodeB information for the EPS bearers of that UE and sends a release access bearers response message to the MME.

In step 5, the MME requests the eNodeB to release the S1 UE context, by sending the UE context release command message to the eNodeB. The UE context release command message includes information such as Message Type, Choice UE S1AP IDs [including: UE S1AP ID pair, MME UE S1AP ID], and cause. In step 6, the release of the UE Context is acknowledged by the eNodeB (eNB) by sending the UE Context Release Complete message to the MME (before or after releasing the RRC Connection). The UE context release complete message includes parameters such as Message Type, MME UE S1AP ID, and eNB UE S1AP ID. In step 7, the eNodeB releases the RRC Connection.

Figure 9:
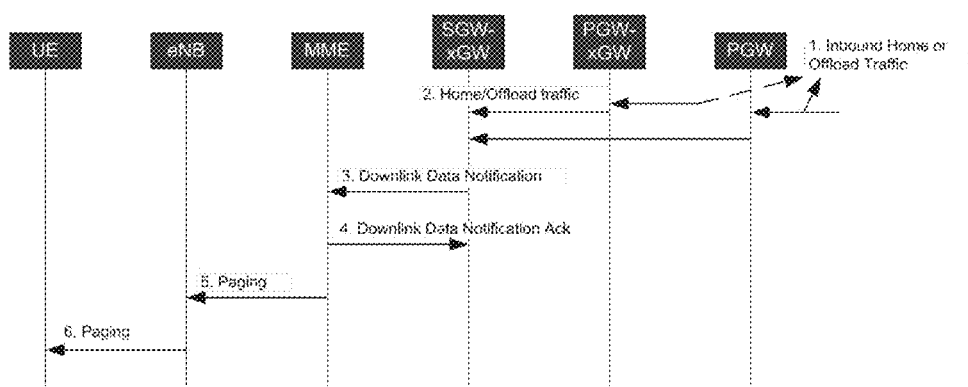
FIG. 9 illustrates paging in accordance with certain embodiments.

In some embodiments, the UE can enter into an idle state in order to conserve battery life. In this idle state the UE releases radio network connections and only periodically checks for activity. The UE is sent a page by the network in order to wake the UE up and to establish a connection to communicate date to the UE. If the PGW-xGW receives (offload) traffic for the UE or the PGW receives home traffic for the UE, the traffic is forwarded to the SGW-xGW which in turn informs the MME to page the UE. FIG. 9 illustrates paging due to inbound traffic in accordance with certain embodiments. In step 1, the PGW-xGW and/or the home PGW may receive data for the UE. In step 2, this data is forwarded to the SGW-xGW. In step 3, the SGW-xGW notifies the MME of incoming (downlink) data by sending a downlink data notification message to the MME. In step 4, the MME acknowledges this message by sending a downlink data notification acknowledgement message to the SGW with the cause IE set to "request accepted". The downlink data notification acknowledgement message can include information such as cause and recovery (if contacting peer for the first time).

In step 5, the MME pages all or select eNodeBs in the tracking area identity (TAI) list by sending the paging message to these eNodeBs, including either IMSI or S-TMSI of the UE and the TAI of the TA where paging is performed. The paging message can include parameters such as Message Type, UE Identity Index value, UE Paging Identity, CN Domain, and a list of TAIs. In step 6, the eNodeB pages the UE in the cells of the tracking area (TA) by sending paging message in these cells, including the S-TMSI of the UE. If the UE receives the page, the UE responds by initiating the UE Triggered Connection Re-activation, which is described above.

Figure 10:
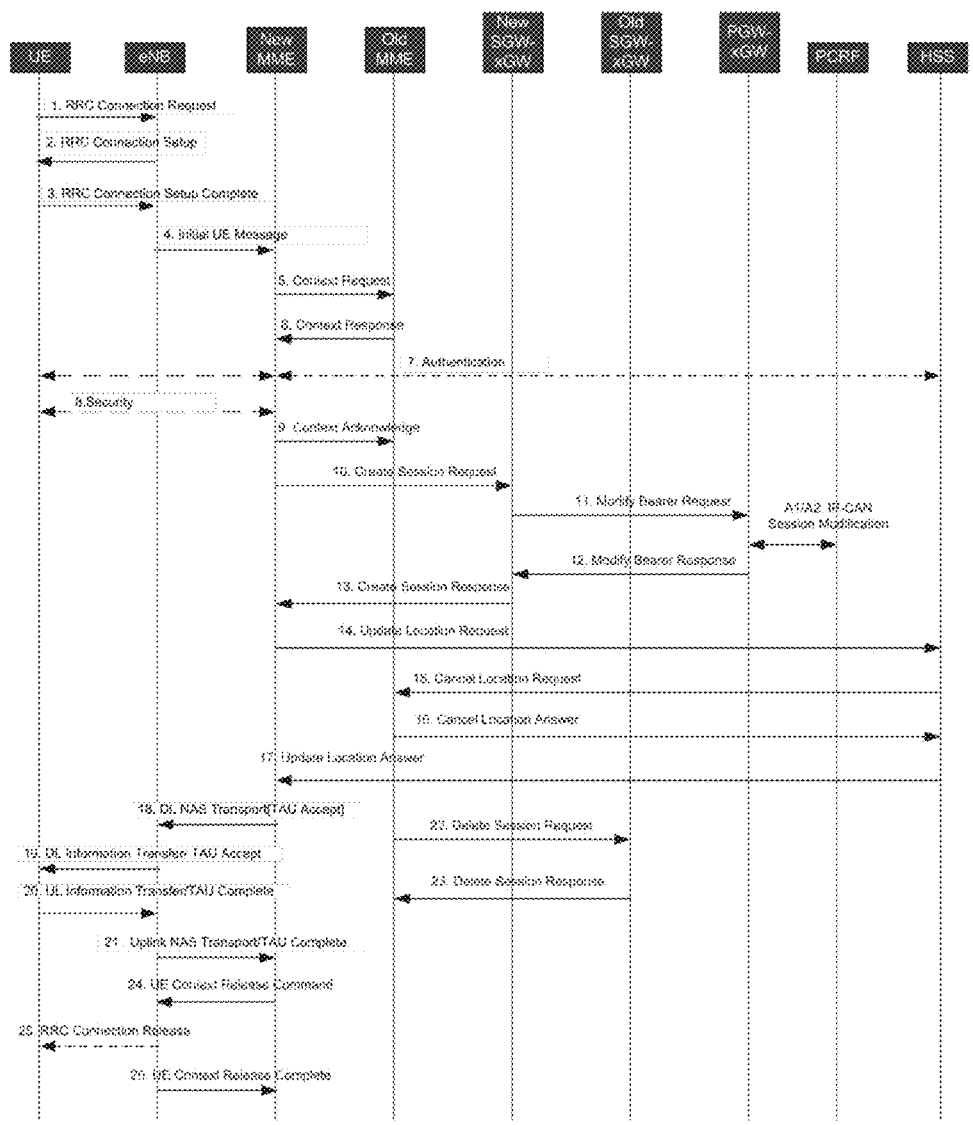
FIG. 10 illustrates updating idle mode mobility in accordance with certain embodiments.

A situation when a UE wakes from an idle state and has been relocated prompts an update to the network. This tracking area update (TAU) can prompt a relocation of one or more network devices depending on the mobility of the idle UE. When only SGW relocation occurs, the MME manages the PDN relocation to the new SGW. However, in some cases both the MME and the xGW are relocated. FIG. 10 illustrates a tracking area update with MME and SGW relocation in accordance with certain embodiments. The relocation can involve setting up a context on a new MME, authenticating the new MME, and using the new MME to setup a session on a new offload gateway. Bearers are also modified between the xGW and the PGW for home traffic.

The relocation process begins in step 1 with the UE requesting a RRC connection with a UE identification (ID) and a RRC connection cause. The upper layers provide an S-TMSI or draw one random number as UE ID and provide a connection cause. In step 2, the eNodeB initiates a connection setup with SRB1 parameters in the radio resource configuration. In step 3, the UE initiates the tracking area update (TAU) procedure by sending to the eNodeB, a TAU Request message together with RRC parameters. The TAU request message can include information such as protocol discriminator, security header type, tracking area update request message identity, EPS update type, NAS key set identifier-ASME, old GUTI, E network capability, Last visited TAI, EPS bearer context status, and supported codecs. The RRC parameters can include a selected PLMN-ID or a MME ID. The PLMN-ID includes a PLMN, a MME group ID, and a MME ID. The MME ID can be represented by GUMMEI.

In step 4, the eNodeB derives the MME to select for further communication from the RRC parameters. After deriving the MME, the eNB passes a NAS TAU request message to that MME using an S1 Initial UE message. The initial UE message can include parameters such as Message Type, eNB UE S1AP ID, NAS-PDU [TAU Request message], TAI, E-UTRAN CGI, and RRC Establishment Cause. In step 5, based on the GUTI, the new MME determines the old MME address. The new MME sends context request message that includes information such as GUTI, Complete TAU request message, S10 Address and TEID for the control plane. If the integrity protection of the TAU Request message is validated, the MME includes the IMSI and MS validated IEs.

In step 6, when the old MME cannot validate the TAU request message, it responds with "User Authentication Failed" cause in context response message. This causes the new MME to initiate an authentication procedure as shown in step 7 of FIG. 10. If the new MME can authenticate the UE, then it sends a context request message back to the old MME. The context request message can include parameters such as IMSI, Complete TAU Request message, S10 Address and TEID for Control Plane, and MS validated. The old MME responds with context response message that can include parameters such as cause, IMSI, MME UE MM Context, MME UE EPS PDN Connections, Sender F-TEID for Control Plane, SGW S11 IP Address for the control plane, and SGW node name (if available). The MME UE EPS PDN Connections IE includes the following IEs: APN, Bearer Contexts, IPv6 Address, PGW S5/S8 Address and TEID for Control Plane, and may include the following IEs: IPv4 Address, PGW node name, and APN-AMBR.

In step 7, authentication can occur between the UE, the new MME, and the HSS depending on whether the old MME is able to validate the TAU message. In step 8, security messaging can occur between the UE and new MME depending on whether the old MME is able to validate the TAU message. In step 9, the new MME sends a context acknowledgement message to the old MME. The context acknowledgement message can include parameters such as cause and indication. The SGW change indication flag in the indication IE is used to indicate a SGW change. In step 10, the MME sends a create session request message to the New SGW-xGW. The create session request message can include parameters such as IMSI, MSISDN, MEI, ULI, RAT Type, Indication Flags, Sender F-TEID for control-plane, PGW Address for C-plane or proxy mobile IP (PMIP), APN, PDN Type, PAA, Maximum APN Restriction, LBI, Bearer Contexts [including, e.g., EBI, Bearer QoS, Charging Characteristics], and recovery (if contacting peer for first time).

In step 11, the New SGW-xGW sends a modify bearer request message to the PGW-xGW. The modify bearer request message can include parameters such as Sender F-TEID for Control Plane, ULI, and Bearer Contexts to be modified [including, e.g., EPS Bearer ID; S5/S8-U SGW F-TEID]. In step A1, the PGW-xGW sends a credit control request (CCR) message based on the trigger type to the PCRF. The CCR can include, e.g., Session-Id, CC-Request-Type=UPDATE, Event-Trigger values (USER_LOCATION_ CHANGE, AN_GW_CHANGE), User Location Info (new TA), and AN-GW-Address. The PGW-xGW includes the applicable event triggers and corresponding data based on the event triggers to which the PCRF had subscribed. In step A2, the PCRF responds with a credit control answer (CCA) for the bearer. The CCA can include, e.g., Session-Id, Result-Code, CC-Request-Type=UPDATE, [Charging-Rule-Install], [Charging-Rule-Remove], [QoS-Information], [Event-Triggers].

In step 12, the PGW-xGW responds with a modify bearer response message to the SGW. The modify bearer response message can include parameters such as cause, MSISDN, and Bearer Contexts Modified [EBI, Cause]. In step 13, the SGW-xGW responds with a create session response message to the MME. The create session response message includes parameters such as cause, Change Reporting Action, PGW S5 Address Control Plane (F-TEID), APN Restriction, APN-AMBR (if modified by the PCRF), and Bearer Contexts Created [including, e.g., EPS Bearer ID, S1-U SGW F-TEID, S5/S8-U PGW F-TEID, Cause, UL TFT, DL TFT (both optional), Bearer Level QoS (optional), Charging ID]. In step 14, the new MME sends an update location request message to the HSS. The update location request message can include parameters such as User Name, ULR Flags, Visited PLMN ID, and RAT Type. The User Name can be set to the UE's IMSI in some embodiments.

In step 15, the HSS sends a cancel location request message to old MME. The cancel location request message can include parameters such as User-Name and Cancellation-Type. The cancellation-type is set to MME-Update-Procedure. In step 16, the old MME responds with a cancel location response message that can include parameters such as Result-Code/Experimental-Result. In step 17, the HSS replies to the new MME with an update location answer message that can include parameters such as result, ULA-Flags, Subscription Data, PGW FQDN, and MSISDN. ULA-Flags and Subscription Data can be provided when the result is success. In step 18, the new MME sends a TAU accept message in the downlink NAS Transport message to the eNB. The TAU accept message can include parameters such as Protocol Discriminator, Security header type, Tracking area update request message identity, EPS update result, and spare half octet. Optional parameters are GUTI, TAI list, EPS bearer context status and MS ID.

In step 19, the eNB passes the TAU accept message to the UE in a downlink information transfer message. In step 20, if the TAU accept message contained a GUTI, then the UE returns a TAU complete message to the MME to acknowledge the received GUTI. The TAU complete message can include parameters such as Protocol Discriminator, Security header type, and tracking area update complete message identity. In step 21, the eNB passes the TAU complete message to the new MME in an UL NAS transport message. In step 22, since the Old MME receives a SGW change indication, in the context acknowledgement message, the old MME sends a delete session request message to the Old SGW-xGW when there are active bearers. The delete session request message can include parameters such as LBI and indication flags. The operation indication flag may not be set. In step 23, the old SGW-xGW responds with a delete session response message including parameters such as cause to the Old MME.

In step 24, as the S1 context was created in step 4 above, the S1 release takes place when no bearer establishment is necessary (i.e., the "Active Flag" in TAU request is not set). The MME releases the S1 interface by sending the UE context release command message to the eNB. The UE context release command message can include parameters such as Message Type, Choice UE S1AP IDs [including, e.g., UE S1AP ID pair, MME UE S1AP ID], and cause. In step 25, if the RRC connection is not already released, the eNodeB sends a RRC connection release message with release cause information to the UE in an acknowledged mode. Once the message is acknowledged by the UE, the eNodeB deletes the UE's context. In step 26, the eNB responds to the MME with the UE context release complete message releasing the S1 connection between eNB and MME for the UE. The UE context release complete message can include parameters such as Message Type, MME UE S1AP ID, eNB UE S1AP ID.

Figure 11:
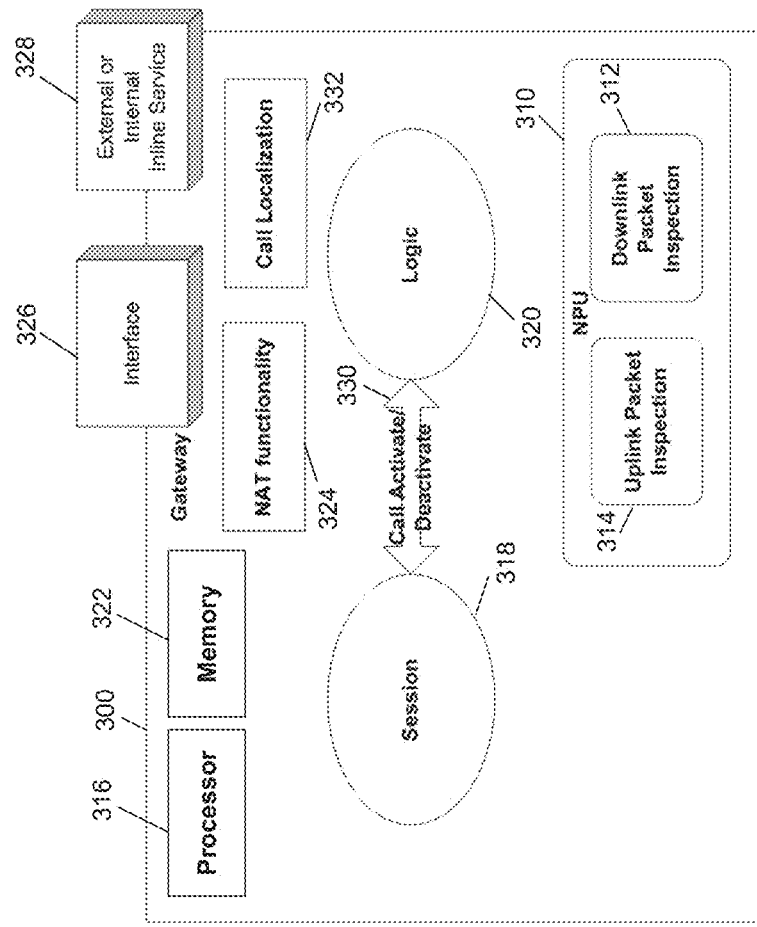
FIG. 11 illustrates logical offload gateway in accordance with certain embodiments.

FIG. 11 illustrates a logical view of an offload gateway that implements offloading in accordance with certain embodiments. The gateway 300 includes a network processing unit (NPU) 310, downlink packet inspection 312, uplink packet inspection 314, a processor 316, a session manager 318, a logic 320, a memory 322, a NAT functionality 324, an interface 326, and an external/internal inline service 328, communication module 330, and call localization functionality 332. The processor 316 and memory 322 are used to provide session manager 318, logic 320 and NAT functionality 324. For example, session manager 318 can include information stored in memory 322 upon which action is taken by processor 316. In some embodiments, logic 320 can be implemented as a module that is a combination of hardware and software. Logic 320 includes data stored in memory 322 such as rules for analyzing packets, state information that is used in analyzing packets and preserving decision, and configuration information. Multiple logics 320 can be used in offload gateway 300. The logic can communicate with NPU 310 to setup packet directors for specific flows or packet types. The inspectors setup in NPU 310 can be filers or other rules implemented in any combination of hardware or software. In some case, the packet directors use shallow packet inspection to quickly sort and direct packets.

The packet inspectors in NPU 310 can monitor packets and direct packets (or information from the packets) to the proper module by checking packets for certain criteria and directing the packets based on the criteria. Typically, the packet inspectors in NPU 310 perform a limited inspection of the packet based on what is expected of packets in the flow or based on a certain category of packet. If the packet meets certain criteria, it is directed according to the proper module, which is typically an logic 320.

In the example of a real-time streaming protocol video stream, the RTSP requests are received by the gateway 300 at an interface. Session manager 318 can setup an offload logic in logic 320 for this expected flow and can also setup a packet inspector in NPU 310 to direct packets to offload logic of logic 320 for further analysis, modification, or redirection. Session manager 318 analyzes messages to activate and deactivate sessions, and if needed offload logic, in gateway 300. During the inspection of the messages by session manager 318, information is also obtained that can be used to setup the session, authenticate the session, and link the session to a subscriber profile. When a new session is activated, session manager 318 can authenticate the call to load the subscriber profile. The authentication can involve the NAI, the MSID, the user name and password, or any other authentication attribute of the user equipment. The subscriber profile includes configuration information such as the subscriber access control list (ACL), and other services applied for this subscriber. When the call is authenticated or authorized, then QoS can be setup on a per-session basis and the packet flow begins. The session manager may also authenticate the subscriber with a PCRF so the PCRF can send policy information and instructions regarding QoS and services to be provided to the subscriber's data. This information may impact whether traffic is offloaded. If the traffic is determined to be offloadable, then the packet flow is sent to NAT functionality 324, which sends it to interface 326 for offload. Offload logic defines how packet flows are handled by gateway 300 based on the characteristics of the packets, which includes information in a packet header.

In providing offload of data, the offload logic includes analyzing and determining what traffic is eligible for offloading. The offload logic can use an analyzer to inspect and analyze packets received in a variety of protocols at the different layers of the open systems interconnection (OSI) stack. The offload eligibility module supports, inspects, and analyzes at least the following protocols: internet protocol (IP), internet message access protocol (IMAP), transmission control protocol (TCP), user datagram protocol (UDP), domain name system (DNS), file transfer protocol (FTP), trivial file transfer protocol (TFTP), simple mail transfer protocol (SMTP), post office protocol version 3 (POP3), hypertext transfer protocol (HTTP), internet control message protocol (ICMP), wireless access protocol (WAP), wireless transaction protocol (WTP), wireless session protocol (WSP), real-time protocol (RTP), real-time streaming protocol (RTSP), multimedia messaging service (MMS), session initiation protocol (SIP), session description protocol (SDP), and MSN Messenger.

The analyzer can be based on configured rules that may be static or dynamically provisioned. Rules used for traffic analysis analyze packet flows and form offload decisions. The analyzer performs shallow (Layer 3 and Layer 4) and deep (above Layer 4) packet inspection of the IP packet flows, depending on the packet and the rule for offloading. Shallow inspection includes examining, for example, the IP header (Layer 3) or UDP/TCP header (Layer 4), while deep packet inspection includes examining, for example, the Uniform Resource Identifier (URI) information (layer 7). The analyzer can also correlate layer 3 packets (and bytes) with higher layer trigger criteria (e.g. URL detected in a HTTP header) and also perform stateful packet inspection with complex protocols like FTP, RTSP, SIP that dynamically open ports for the data path. The shallow and deep packet inspection identify trigger conditions that are used in determining whether a packet or packet flow is eligible for offload.

In some cases, Layer 3 and 4 analyzers that identify a trigger condition are insufficient for offloading determination purposes, so layer 7 is used. For example, the web site www.companyname.com corresponds to IP address 1.1.1.1. Since all parts of this web site correspond to a destination address of 1.1.1.1 and port number 80 (http), the determination of offloadable user traffic may need to be through inspection of the actual URL (Layer 7). For example, a video about the company (www.companyname.com/video) is offloadable, but this information may not be available from shallow packet inspection to setup the offload. Deep packet inspection performs packet inspection beyond Layer 4 inspection and is typically deployed for detection of URI information at level 7 (e.g. HTTP, WTP, RTSP URLs) and the identification of true destination in the case of terminating proxies, where shallow packet inspection would only reveal the destination IP address/port number of a terminating proxy such as the operating company's WAP gateway. The gateway can also perform de-encapsulation of nested traffic encapsulation, e.g. MMS-over-WTP/WSP-over-UDP/IP, and verification that traffic actually conforms to the protocol the layer 4 port number suggests. The offload module has the ability to employ deep packet inspection if shallow packet inspection does not provide enough information on which to make an offload determination.

In providing inspection and offloading, rule definitions can be used to determine whether packets are eligible for offloading. Rule definitions (ruledefs) are user-defined expressions, based on protocol fields and/or protocol-states, which define what actions to take when specific field values are true. Expressions may contain a number of operator types (string, =, >, etc.) based on the data type of the operand. For example, "string" type expressions like URLs and hostname can be used with comparison operators like "contains", "!contains", "=", "!=", "starts-with", "ends-with", "!starts-with" and "!ends-with". Integer type expressions like "packet size" and "sequence number" can be used with comparison operators like "=", "!=", ">=", "<=". Each Ruledef configuration can include multiple expressions applicable to any of the fields or states supported by the respective analyzers. Each rule definition can be used across multiple rule bases and up to 1024 Ruledefs can be defined in some embodiments.

Rule definitions have an expression part, which matches particular packets based upon analyzer field variables. This is a boolean (analyzer_field operator value) expression that tests for analyzer field values. For example; http url contains cnn.com or http any-match=TRUE. The categories of ruledefs include routing ruledefs and offload ruledefs. The routing ruledefs are used to route packets to content analyzers. Routing ruledefs determine which content analyzer to route the packet to when the protocol fields and/or protocol-states in ruledef expression are true. Offload ruledefs are used to specify what action to take based on the analysis done by the content analyzers. Actions can include redirection, offloading, dropping, or normal forwarding, charge value, and billing record emission. Ruledefs are configurable through commands sent to the gateway. Ruledefs support a priority configuration to specify the order by which the ruledefs are examined and applied to packets.

The offload gateway can be implemented in a network device using a combination of hardware and software. In one embodiment, the offload gateway can be implemented as a service in a network device. There can be one offload gateway service per virtual private network (VPN) or context on the network device. The offload gateway service can be implemented in an operating system such as Linex. In one embodiment, the offload gateway service provisions a GTPC and at least one GTPU IP address for use in offloading. The service starts depending on a successful binding of the provisioned IP addresses with the software functionality. After the binding, then instances of the service can be instantiated in the operating system. The first offload gateway service instance that is created causes a start of an offload gateway specific proclet (a lightweight process), the offload gateway manager (OGW-MGR). The offload gateway service instance configuration can be pushed to the session managers (sessmgrs) by a session control (sessctrl) function.

The offload manager provides a first point of entry for new control plane messages, such as PDP context request messages or session establishment messages. The offload manager assigns the incoming session establishment messages to a session manager if there is a criteria match in the offload logic.

In one embodiment, the offload gateway manager can be the first point of entry for new messages such as PDP contexts. The offload gateway manager can load balance new PDP requests to a session manager (sessmgr) if the PDP matches one of the top-level offloading criterion (APN/IMSI/IMEI/Location). The offload gateway manager can also work with the network processing unit (NPU) to setup flow directors that recognize and direct packets to the appropriate functionality in the offload gateway. In this embodiment, the offload gateway manager handles nodal GTPC messages for the offload gateway. The offload gateway manager sets up a GTPC flow director in the NPU corresponding to the GTPC addresses specified for each of these services for the TEID-C value of 0. The GTPC/GTPU messages that cannot be matched to a session in the sessmgr can be directed to the offload gateway manager. The offload gateway manager can be the default handler for such messages.

If the chassis is operating in a standalone mode, the offload gateway manager intercepts and parses control plane messages for RAB Assignments/Release, SRNS Procedures, RAU Procedures, and any other session establishment messages. The offload gateway manager installs flow directors in the NPU corresponding to the configured end-point identifiers.

For the offload gateway service, the offload gateway manager implements a light-weight GTP stack capable of decoding and encoding GPRS tunneling protocol-control (GTP-C) messages as well as standard GTP mechanisms such as retransmission timers and attempts. In some embodiments, each primary PDP context is considered a separate call, even if it originates from the same subscriber. A callline can be allocated per primary PDP. A primary and any associated secondary PDP contexts can be anchored by the same callline. The credit allocation for a callline for the offload gateway service can be the same as that of the home gateway with NAT enabled. NAT'ing of subscriber data sessions can be carried out at the sessmgrs.

In some embodiments, the offload gateway uses a common GTP service flow (per service-ip-address per sessmgr) for subscribers connecting via a given offload gateway service instance. Downlink data packets received from the home gateway can be forwarded to the radio network serving the subscriber. Downlink data packets received on the public network, first pass through the NAT module before being sent to the offload gateway module. Uplink data packets are either forwarded out the public network via the NAT module or sent to the GGSN if the packet does not match the NAT rules. For the offload gateway service, the sessmgrs implement a GTP stack capable of handling both GTP-C and GTP-U messages.

Security in Offloading

The offloading of user data, to a public network such as the Internet, as close to the radio network as possible is highly desirable to reduce the control the ever growing requirement for large-scale bandwidth increases across the entire transport path from the radio to the packet core. Security can be provided by defining a mechanism for the offload gateway to provide user equipment and/or network devices on the Internet with cipher keys to the offload gateway. These keys can be used to decrypt and encrypt messages to offload a subscribers data.

The keys can be supplied to the offload gateway by the SGSN or SGW by sending modified control plane messages to carry the negotiated keys. The offload gateway can be used to negotiate the keys. The offload gateway can also inspect packets to authenticate that a packet received from the Internet does not compromise the security of the mobile operator's network. Packets that are received and cannot be authenticated are dropped.

Localization in a Gateway

Systems and methods are disclosed that provide localization of packet flows in a communication network. The localization allows a packet flow to be confined within the radio access network and to go from a first mobile to a second mobile efficiently, bypassing other network devices. The packet flows can be voice calls in which one or more mobile nodes (e.g., user equipment) are serviced by the same radio access network (RAN). The RAN can be an evolved nodeB, a radio network controller, a base station controller, or any other device that can confine the data path to localize a call between mobile devices communicating using the same device. A mechanism for call localization can be developed to detect a communication path that is confinable to the RAN, to signal information from the RAN, and to fallback to gateway forwarding in the event of a handover.

Figure 12:
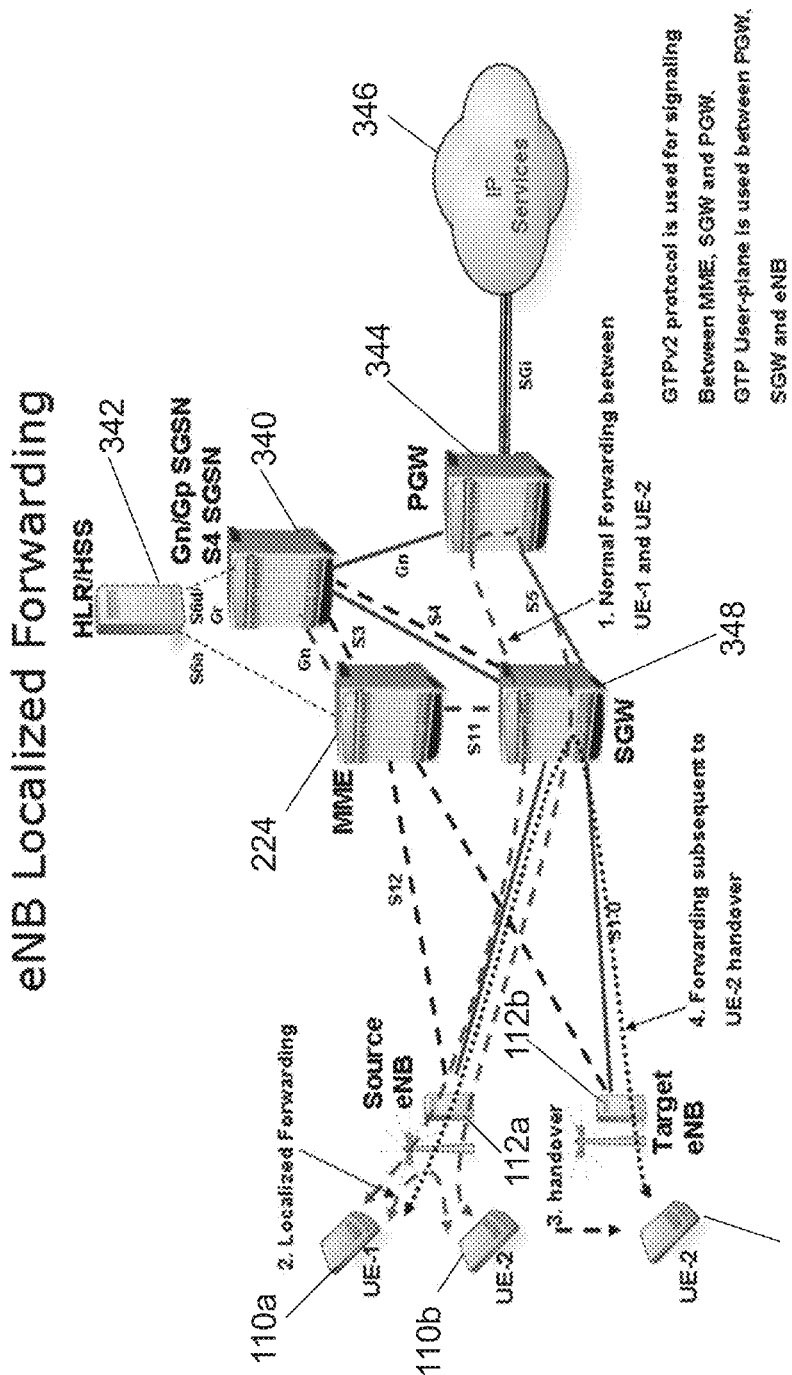
FIG. 12 illustrates a network with localized packet flows in accordance with certain embodiments.

FIG. 12 illustrates a network with localized packet flows in accordance with certain embodiments. FIG. 2 includes user equipment 110a and 110b, source eNB 112a, target eNB 112b, MME 224, SGSN 340, home location register (HLR)/HSS 342, PGW 344, IP services 346, and SGW 348. As shown in item 1, forwarding between UE 110a and UE 110b at source eNB 112a passes through SGW 348 and PGW 344. By routing the packet flow through SGW 348 and PGW 344, bandwidth and network resources are used by the network that can be reduced by confining the packet flow between UEs 110a and 110b. As shown in item 2, localized forwarding can allow a packet flow to be forwarded from a first UE 110a to a second UE 110b, without passing through the SGW 348 and PGW 344. In the event of a handover (item 3) from source eNB 112a to target eNB 112b of UE 110b, the localized forwarding mechanism can provide a handover and pass the packet flow through SGW 348 (item 4). References to S5, S12, S6a, S11, Gn, etc. are to known interfaces between components.

Figure 13:
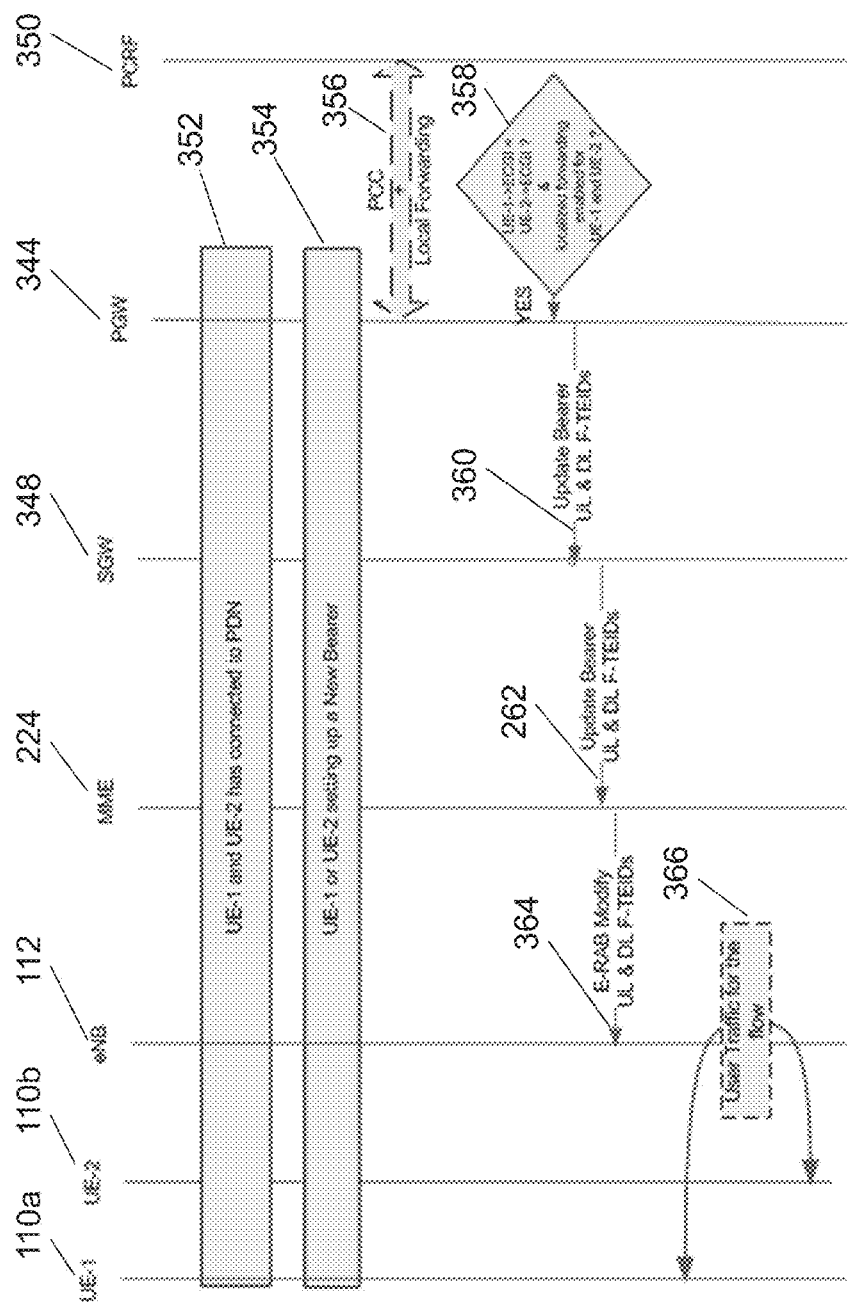
FIG. 13 illustrates a call flow diagram for packet flow localization in accordance with certain embodiments.

FIG. 13 illustrates a call flow diagram for packet flow localization in accordance with certain embodiments. In reference 352, UE 110a and UE 110b establish a connection to the packet data network (PDN) through PGW 344. In reference 354 UE 110a and UE 110b set up a new bearer which can transfer packet data to and from the PDN. The bearer can be a tunnel initiated between the user equipment (UE) and the PGW 344. A policy and charging rules function (PCRF) 350 can optionally exchange policy and charging control messaging and local forwarding rules with either PGW 344 or SGW 348 in reference 356. In reference 358, rules for detecting packet flow localization can be sent to the gateway. The rules can specify what identifying information to use to determine when user equipment packet flows can be localized. The rules can also specify under what conditions the localization occurs, e.g., are certain services provided to the packet flow where localization is not desired. The identifying information can be the IP address, uplink and downlink tunnel endpoint identifiers (such as fully qualified tunnel endpoint identifier (F-TEID)), cell id, and location information for example.

In reference 360, an update bearer message is sent from PGW 344 to SGW 348 with identifying information such as uplink (UL) and downlink (DL) F-TEIDs. An update bearer message is sent from SGW 348 to MME 224, in reference 362, with identifying information such as UL and DL F-TEIDs. In reference 364, an evolved radio access bearer modify message is sent from MME 224 to eNB 112 with identifying information such as UL and DL F-TEIDs. The eNB 112 can use this information in reference 366 to provide localization of packet flows between UE 110a and UE 110b. The eNB 112 can forward the packets received from UE 110a to UE 110b and vice versa. The eNB 112 can also send periodic updates to either PGW 344 or SGW 348 to update billing information or other functions.

Localized forwarding within the LTE RAN enables the data path to be confined to the eNB when at least two communicating UE's are attached to the same eNB. The mechanism for this feature can comprise the following components: (i) detection of a communication path as confinable to an eNB, (ii) signaling mechanism, and enforcement of intra-eNB forwarding; and (iii) fallback to intra-SGW forwarding in the event of inter-eNB handover.

The detection of the communication path can be implemented in a PGW or in an SGW. The sequence of events occurs between the UE, the PGW, and SGW. At the time of initial attach, the User Location Information (ULI) of the UE can be reported in terms of an Enhanced Cell Global Identifier (ECGI) to the gateways (e.g., in a GTPv2 Create Session Request message). A gateway (PGW/SGW) maintains a set of UE's with the same ECGI value in a data structure. A policy flag denoting whether localized forwarding is supported for a UE is also maintained as part of UE context (e.g., a session or other data structure) at the gateways. In some embodiments, when a packet arrives from UE-1 to UE-2 at a gateway, the gateway verifies this logic: (1) if UE-1->ECGI= UE-2->ECGI, AND (2) if policy for localized forwarding is enabled for both the UEs (e.g., if UE-1 RAN identifying information matches UE-2 RAN identifying information and policy is enabled allow localized forwarding).

If the above conditions are met, then the flow is a candidate for localized forwarding at the eNB. In the absence of ULI information, the following mechanism can be used at the SGW to detect a flow as confinable to an eNB under these conditions: if the Destination IP address in the inner IP packet (i.e., UE's payload packet) from the eNB matches the destination IP address in the inner IP packet from the PGW and SGW. If the source IP address of the outer IP packet (i.e., eNB's IP address) matches the stored destination IP address for the outer IP packet when a packet arrives from the PGW. Then the flow can be confinable to the same eNB subject to policy rules.

When a detection mechanism is implemented at the PGW, the sequence of events can be as follows. A trigger (such as PCRF interaction) indicates the applicability of localized forwarding. The PGW sends a message—such as a GTPv2 Update Bearer Request message containing the U-plane F-TEID of the uplink and downlink flows as part of the Bearer Context IE (information element). The SGW sends a message—such as a GTPv2 Update Bearer Request message to the MME providing its own uplink and downlink U-plane F-TEIDs for the bearer. The uplink F-TEID can identify the traffic from the eNB to SGW, and downlink F-TEID can identify the traffic from the SGW to the eNB. Both of these F-TEIDs can be established a priori (through appropriate GTPv2 messages—such as Create Session Request, Modify Bearer Request). At that point, the MME sends a S1-AP message—such as E-RAB Modify Request to the eNB in which it includes the uplink and downlink F-TEID's. The additional parameters can be added to the messages as optional parameters.

Once it processes the message from the MME, the eNB can insert the following forwarding rule: "Upon receiving a packet from the UE, lookup if there is a matching entry for localized forwarding (i.e., if the uplink F-TEID for the packet has a corresponding entry for the downlink)". If an entry exists for localized forwarding, forward locally; else forward using the normal procedure. If forwarding locally, perform one or more of the following: Update statistics; billing; lawful interception; or other functions as necessary. In this embodiment, the eNB responds to the MME with an E-RAB Modify Response.

When a detection mechanism is implemented at the SGW, the SGW interaction with the MME and the MME interaction with the eNB is the same as in the case of detection based at the PGW. In addition, the SGW informs the PGW about the localized forwarding by sending a message—such as a GTPv2 Modify Bearer Request with "Localized Forwarding" set to 1 as part of the Indication IE, and includes the EPS Bearer ID in the Bearer Context IE. The PGW responds with a message—such as a GTPv2 Modify Bearer Response. The rest of the mechanism can be the same as described earlier.

A handover procedure where a UE moves from a localized packet flow to another eNB can be handled as follows. One of the UEs whose traffic is forwarded locally may undergo handover to another eNB served by the same SGW. In some embodiments, the source eNB is informed to forward packets back to the SGW as soon as possible. This can be achieved using the following: the MME receives a Path Switch Request message from the target eNB (see X2-based handover, TS 23.401). Then, the MME sends an E-RAB Modify Request message to the source eNB instructing it to stop performing localized forwarding. The source eNB deletes the localized forwarding state; specifically, it deletes the F-TEID used for forwarding locally. The source eNB confirms by sending E-RAB Modify Response message. Then, the source eNB resumes forwarding uplink packets to the SGW, as it would without localized forwarding. Once the path switch occurs (i.e., the MME updates the S1-U tunnel with Modify Bearer Request/Response messages) the SGW continues to forward locally (to the target eNB) without having to forward the packets to PGW.

In some embodiments, the localization can be achieved by determining a node is a common tunnel initiator (e.g., shared by at least two devices on the same call session) and then bypassing the tunnel terminator(s) of the call session. The localization can also reduce packet latency and jitter by eliminating the backhaul network hops. The localization can be implemented using data structures in a gateway and intra-eNB forwarding. The data structure can include sessions which are associated with information regarding a particular tunnel and UE. The session can be used to process the data packets and performs tasks such a billing updates and policy enforcement. A session manager can be used to monitor the session and instruct the processor regarding packet flows related to the session.

In some embodiments, localization can be implemented by checking certain conditions. For example, checking whether the destination IP address of the packet matches the IP address of another session on the device. If these conditions are met, in certain embodiments, the software delivers the packet to the matching session. In some embodiments, a flow-based filter such as a traffic flow template (TFT) that uses a combination of criteria such as: source and destination IP address, protocol used, and source and destination port numbers to determine matching sessions. The eNB or localization RAN may send periodic statistics updates to the tunnel terminator or gateway to inform it about locally forwarded packets. This allows the tunnel terminator to update other call parameters such as idle time. The eNB may generate accounting records for localized packet traffic. This may be done using statistics on the packets. The eNB can send accounting information to tunnel terminator so the tunnel terminator can update accounting parameters for the bridged traffic. This update could be periodic or event driven.

Mobility Edge Gateway

The traffic offloading is a traffic engineering mechanism in which a portion of mobile network traffic is forwarded to and from the Internet without traversing the mobile operator's transport network and the traditional gateway. With the advances in mobile network engineering, it is now feasible to connect a Radio Access Network (RAN) with high-speed networking technologies such as Gigabit Ethernet which allow a local point of presence (POP) to the Internet. At the same time, transporting some of the mobile network traffic, such as Internet video, rich web content, via the traditional gateway is becoming both expensive and performance-limited. Solutions to traffic offloading from the RAN can ensure seamless deployment within the standard network designs, can ensure operation in a multi-vendor environment, but enhance value with proprietary extensions, can provide architectural extensibility for supporting multiple functions (such as offload, call localization, content localization, and fixed-mobile convergence), and can ensure that mobility of sessions is supported.

The architecture presented with the EGW can provide for edge functions such as call localization, which is the ability to confine the data path of selected traffic (such as VoIP, peer-peer video) within the network edge, and content localization, which is the ability to confine the data path of selected traffic (such as client-server video) to caching servers within the network edge. In some embodiments, a mobility edge gateway providing offload, call localization, content localization, common subscriber management, and other services is provided. This mobility edge gateway (EGW) can be a streamlined mobility node with edge intelligence. Some of the functions provided by the EGW include the ability to selectively break-out traffic to the Internet at the edge, the ability to confine the data bearer path to the access network and the edge, the ability to provide content localization and delivery at the radio access network in conjunction with the core network, and the ability to provide common subscriber management for multiple access technologies.

Figure 14:
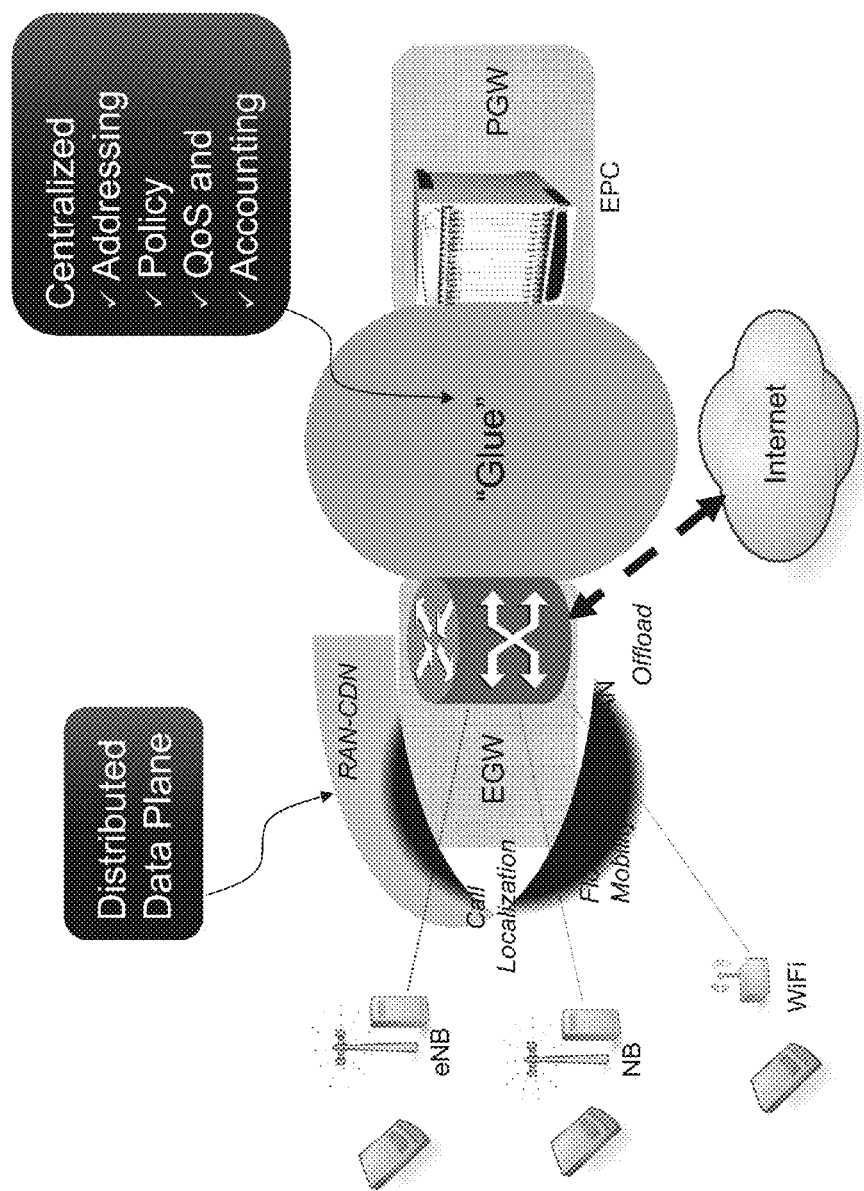
FIG. 14 illustrates a mobility edge gateway (EGW) in accordance with certain embodiments.

FIG. 14 illustrates a mobility edge gateway (EGW) in accordance with certain embodiments. The EGW includes SGW functions as well as some PGW functions, which when present on the EGW can be denote SGW-EGW and PGW-EGW respectively. The EGW sits at the edge of the network and provides intelligence at the edge of the network. With the intelligence pushed to the edge of the network traffic can be pushed out of the core network where appropriate through offloading, call localization, and flow mobility. The EGW communicates with the core network in order to maintain various aspects of the session. This communication provides a glue between the EGW and the PGW. The EGW provides a distributed data plane, while keeping centralized addressing, policy, quality of service (QoS), and accounting. The PGW can serve as the centralized provider of addressing, policy, QoS, and accounting to the EGW. In providing these services, the PGW may be a conduit to other network devices that make decisions on a session by session basis. The PGW can be the node that decides and effects localized forwarding.

As illustrated, offloading, flow mobility, and call localization can be provided across generations of technology and across different radio access network technology such as LTE, UMTS, and WiFi. The SGW-EGW can serve as a enforcement point such as a policy enforcement point (PEP) or a policy and charging enforcement function (PCEF). In some embodiments, the offloading, flow mobility, a call localization can be implemented on a network device using logic that is stored in memory and at least one processor to run the logic and other processes. The logic can, for example, determine what calls to localize as the processor inspects and provides information to the logic. The logic can also make decisions about what packets or traffic to offload or to move to another access technology with flow mobility after receiving information from the processor regarding packets. The process or session running on the memory and in the processor can be responsible for the traffic localization, offloading, or flow mobility once a decision is made by the logic.

The SGW-EGW performs a number of functions. The SGW-EGW can behave as a standard SGW towards the home PGW at the time of UE attach to establish a PDN connection that results in IP connectivity. The SGW-EGW can program traffic rules so that the traffic that needs to be offloaded to the Internet and the traffic which needs to be routed to the home network are identified. The SGW-EGW can establish a node-internal session with the PGW-EGW in order to forward selected traffic for offload. The SGW-EGW can perform call localization and content localization functions, based on the home PGW interaction. In some embodiments, the SGW-EGW acts as an intelligent traffic multiplexer and a demultiplexer for the Internet and home traffic.

In providing offloading, the EGW may use a single common access point name (APN) for offload and home traffic or dedicated APNs for each. With a common APN, the subscriber session is always anchored at the home PGW, and the EGW offloads traffic based on Service Data Flow (SDF) rules. With a dedicated offload APN, the offload session is anchored at the EGW which offloads traffic based on the established PDN connectivity; the non-offload session(s) are anchored at the home PGW. The PGW-EGW performs a NAT operation on traffic received from the SGW-EGW and reverse NAT operation on traffic received from the Internet. This NAT operation is performed to send and receive traffic to and from the Internet based on the EGW's IP network topology.

When there is handover from a base station to another that requires EGW relocation, there can be three ways to provide EGW relocation including those based on a common APN, a dedicated APN, and a target SGW. For a common APN, the MME establishes an indirect data forwarding between the Target SGW-EGW and the Anchor SGW-PGW. This indirect data forwarding can be done on per-bearer basis allowing, e.g., the default bearer traffic, to traverse the anchor SGW-EGW (which then offloads the matching traffic) while the dedicated bearer traffic can be made to traverse the S5 interface directly to the Home PGW. For a dedicated APN, the MME treats the Target SGW-EGW as another SGW, and establishes the S5 tunnel with the PGW-EGW. The target SGW is a standard SGW with no EGW functionality, the MME establishes indirect data forwarding for the selected bearer(s) and also performs S5 tunnel update.

For offload traffic, the EGW provides a single GTP-U termination point. The SGW-EGW terminates the S1-U interface and forwards packets or traffic via an internal PGW on SGi after performing a NAT operation. The offloading is further described above. For call localization, the PGW in the core network instructs the SGW-EGW to localize the data path and the SGW-EGW performs TEID switching. The call localization performed at the EGW is further described in conjunction with patent application publications 2010/0238887 and 20070253371, each of which is hereby incorporated by reference herein in its entirety. For content localization, the PGW provides the a selected cache IP address to the SGW-EGW. The cache can be co-located with the SGW-PGW. The SGW-EGW terminates the S1-U interface and forwards packets and/or traffic to and from the cache. The MME can select the EGW using, for example, FQDN, DNS lookup, or any other known procedure.

The home PGW and the EGW can share a common subscriber management interface. This interface is used for addressing, policy, and accounting. In some embodiment, these functions are centralized at the home PGW which acts a proxy to the EGW, providing a single management console for providers. This interface or "glue" shown in FIG. 14 can be a channel established with the PGW for policy, QoS, accounting. The EGW uses the channel to download flow filters and policy rules for traffic rules and to export traffic accounting records back into the PGW, among other things. The EGW can re-establish the channel during handovers to preserve the glue with the core network and ensure proper maintenance of session on the EGW as well as accounting, billing, and administration on the core network. The PGW can allows provide centralized direction to disparate EGWs through the channel. For example, in a handoff establishing communication between PGW and EGW allows the PGW to provide the flow filters and the previous EGW IP address to establish the traffic forwarding rules at the new EGW.

The PGW can also assist in the enabling of communication between previous and new EGWs. The EGWs can also establish a bidirectional tunnel between each other during handovers so that session continuity of offload traffic is maintained. The decision to establish the tunnel between EGWs can be based on a number of factors. One factor is whether offloading is ongoing and to prevent disruption of a traffic stream to the UE. For example, the existence of a NAT session at the anchor gateway can trigger the setup of a bi-directional tunnel between the EGWs to maintain session continuity until the NAT is setup along with the other functions at the new EGW. Once the new EGW is setup and ready to take over the session, then the tunnel can be torn down when the PDN session is torn down at the old EGW.

Figure 15:
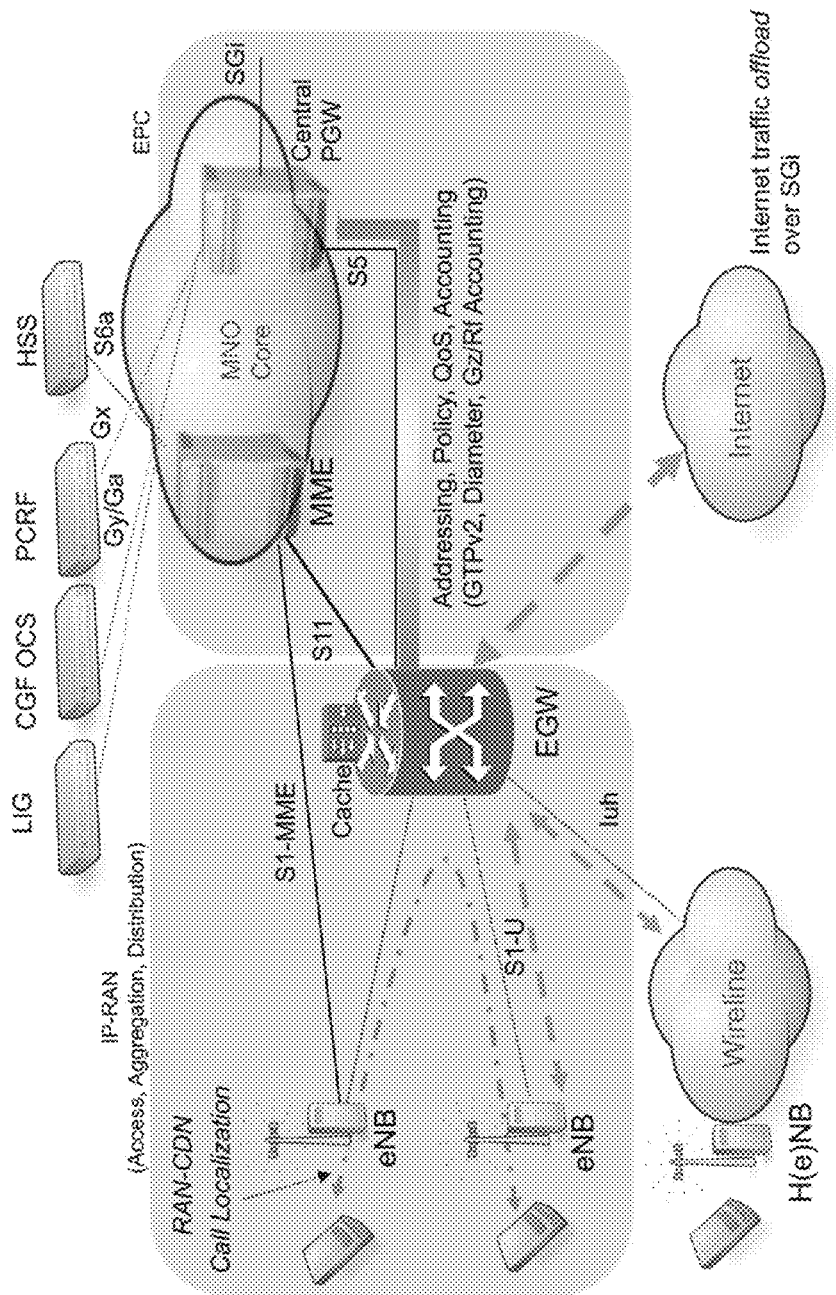
FIG. 15 illustrates an EGW in a communication network in accordance with certain embodiments.

FIG. 15 illustrates an EGW in a communication network in accordance with certain embodiments. As shown, the EGW can be located in the Internet Protocol-radio access network (IP-RAN) instead of the packet core or evolved packet core (EPC). The EGW includes a number of interfaces to provide services in the IP-RAN. The EGW uses an S1-U interface to communicate with the evolved NodeBs (eNBs), a Iuh interface to communicate with the home evolved NodeB (H(e)NB), which can be an LTE femto radio access network that communicates with the EGW using a broadband connection. The EGW can communicate with the MME using an S11 interface. The channel or glue mention above can be an S5 interface with the PGW in the core network. On this S5 interface, in some embodiments, addressing policy, QoS, and accounting information can be communicated. Other protocols can be used to communicate this information such as GTPv2 for addressing, Diameter for policy information, and Gz/Rf accounting for accounting information. The EGW offload traffic to the Internet using an SGi interface.

In some embodiments, the EGW also includes a content cache. This content cache can be a computer readable medium such as random access memory, solid state memory (e.g., Flash memory), magnetic disk drive memory, or any other type of memory. This content cache can be used in the delivery of content to users. When a user wants to view a movie or other content on their UE, the cache can be used to store the content from the content server in order to provide the content from the edge of the network rather than the core. By caching at the edge, QoS can be determined between the UE and the EGW, rather than relying on a QoS pipe along the transmission path from the content server to the UE. The content cache makes providing content to the user less prone to interruptions because of problems in the network.

The EGW provides a number of benefits. For example, the EGW provides seamless operation within the standard LTE EPC architecture. The EGW may not introduce changes to the existing nodes in the LTE EPC architecture while providing the traffic offload service. This can allow operators to introduce the offload service without having to disrupt the existing architecture. Also the EGW provides traffic offloading using existing IP address and/or prefix pools. The EGW can operate on already-assigned addresses or prefixes allowing operators to conserve address management and routing. At the same time, the EGW can provide IP pool management as well as dedicated APN service if the operator chooses to do so. Further, the EGW provides transparent mobility management. In the LTE/SAE architecture, the MME manages the mobility of user equipment (UE). With the EGW, the MME continues to manage the UE mobility without being aware of some traffic being offloaded to the Internet. This includes idle-mode handovers, active handovers and paging. The mobility of offloaded traffic is ensured by anchoring those sessions at the EGW. In addition, the EGW provides sophisticated operation at flexible granularity. The EGW can be configured using a Command Line Interface or programmed via a policy interface (PCRF) to selectively offload traffic (such as Utube video) while forwarding other traffic (such as IMS multimedia) via the operators core network. An operator can specify exactly which kind of traffic (specific bearer, UE, APN and so on) is offloaded directly to the Internet and which kind of traffic is sent via the home network.

The EGW is related to the other network nodes in the following ways in certain embodiments. From the perspective of the MME, the EGW is either an SGW (Common APN deployments) or a combined PGW and SGW (Dedicated APN deployments). When EGW relocation happens due to, e.g., eNodeB handovers, the MME treats the EGW as an SGW. For notation, we use SGW-EGW to denote an SGW collocated with the EGW and PGW-EGW to denote the PGW collocated with the EGW. The MME selects the SGW-EGW and the Home PGW for common APN deployments, based on APN configuration or FQDN configuration in the HSS on a per-subscriber or per-session basis. For a dedicated APN deployment, the MME selects a combined SGW and PGW in the EGW. This allows an operator to configure the service at the time of user attachment to the network. In the combined node, the MME uses an S11 interface towards the SGW-EGW. The MME provides the SGW-EGW's F-TEID for IP address and TEID to the eNB over S1-MME for bearer traffic. The MME manages the X2 and S1 interface mobility with the SGW-EGW. With SGW relocation, the MME establishes the Indirect Data Forwarding (IDF) between the anchor SGW and the target SGW. This procedure can be performed on selective bearers, for example the default bearer (which carries the offload traffic) can be made subject to IDF, enabling the offload traffic to maintain the (NAT) session persistence at the anchor EGW. In addition, the MME manages idle mode mobility and paging with the SGW-EGW.

From the perspective of the Home PGW, the EGW is an SGW in some embodiments. The traffic that is not off-loaded is forwarded by the SGW-EGW to the Home PGW over the S5/S8 interface. Any S5/S8 control plane signaling that is sent to the PGW can be relayed by the EGW. For example, a ULI sent from the MME can be relayed by the EGW to the PGW depending on the policy. In addition, if there is EGW relocation, it appears as SGW relocation to the home PGW. From the perspective of the eNB perspective, the EGW is an SGW in some embodiments. For example, the EGW terminates the S1-U GTP-U tunnel carrying bearer traffic.

Figure 16:
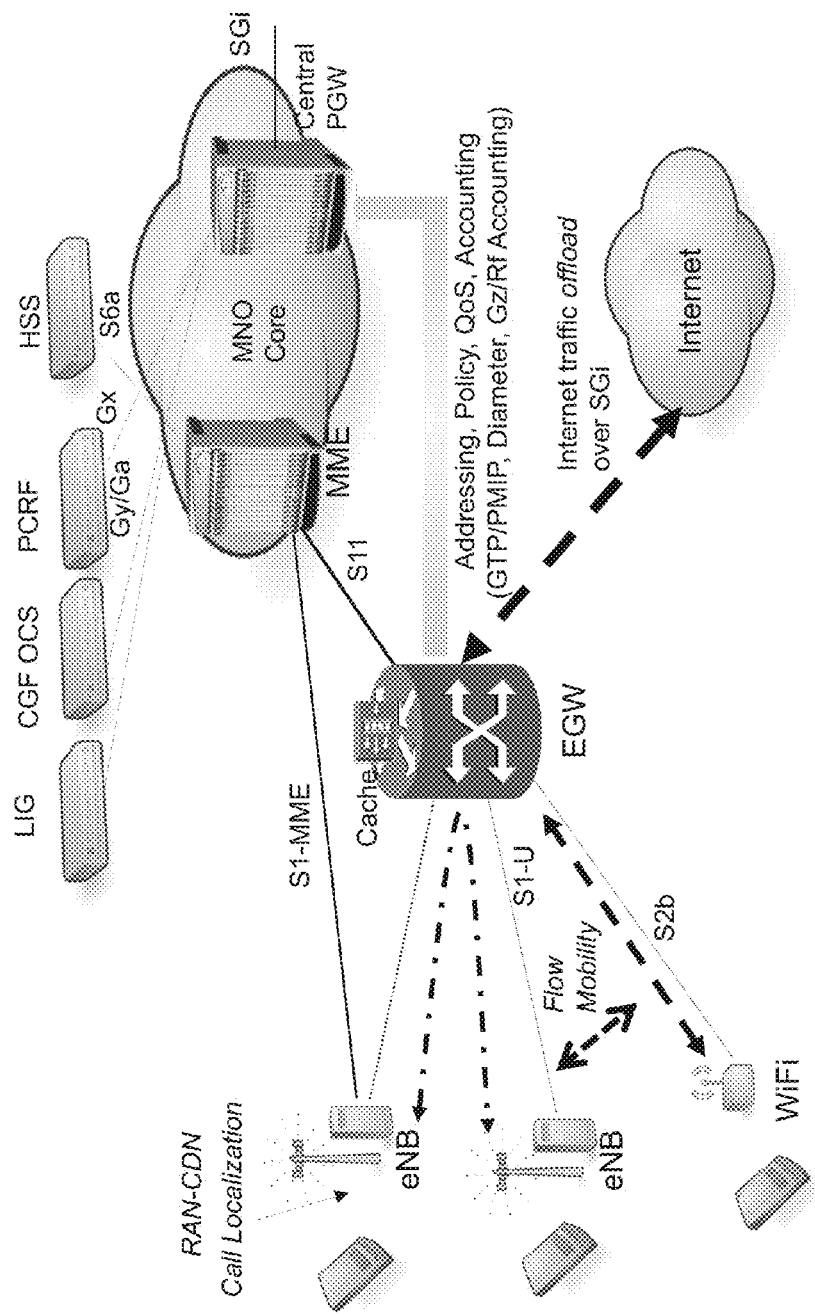
FIG. 16 illustrates a communication network where an EGW provides services such as flow mobility in accordance with certain embodiments.

FIG. 16 illustrates a communication network where an EGW provides services such as flow mobility in accordance with certain embodiments. Flow mobility allows a UE to move from one network technology to another network technology while continuing the same session. Flow mobility also allows distribution of services over multiple radio access technologies. For example, if a subscriber is connected to the communication network by both a WiFi connection and by an LTE radio access network (RAN) connection, the traffic flows to the user equipment can be seamlessly switched between the connections. For example, if the user is downloaded something to his UE, the EGW can select the WiFi connection to download this, which reduces the congestion on the LTE RAN connection. The flow mobility can be provided by the EGW through the use of a centralized or common subscriber management. This can be provided for through the channel to the home PGW from the EGW.

Figure 17:
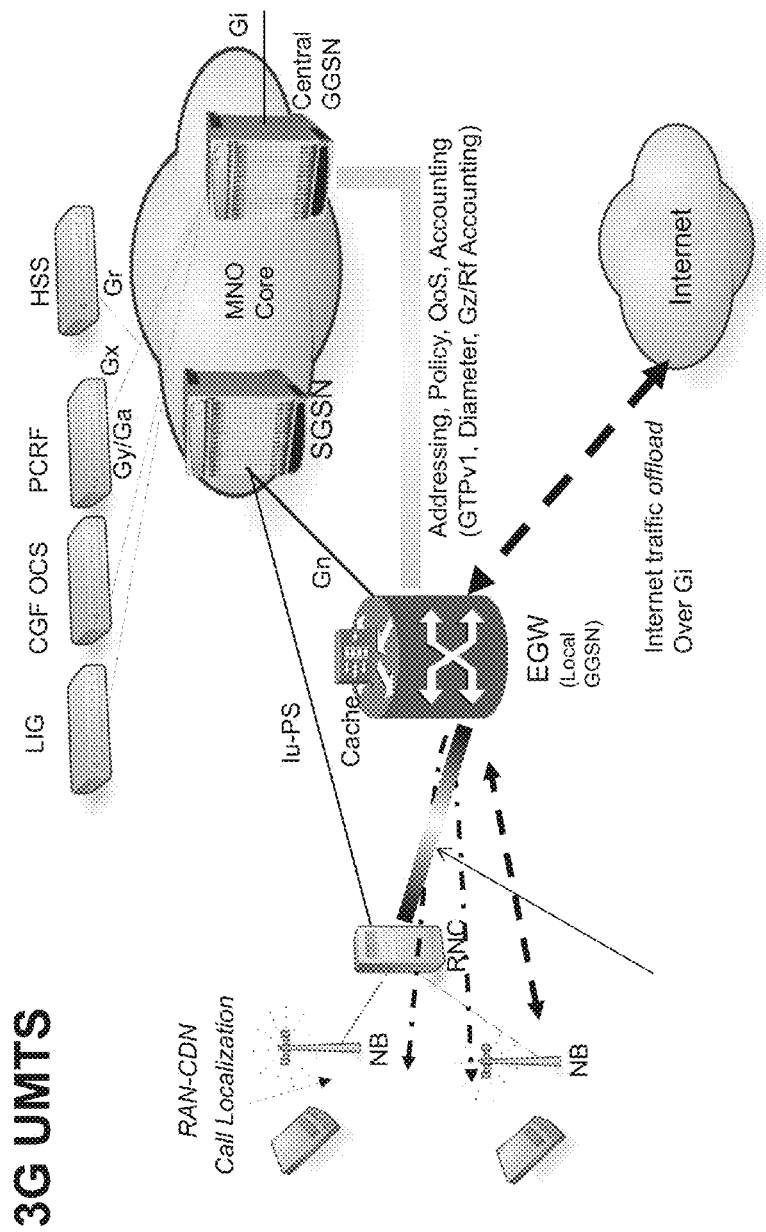
FIG. 17 illustrates an EGW in a 3G UMTS communication network in accordance with certain embodiments.

FIG. 17 illustrates an EGW in a 3G UMTS communication network in accordance with certain embodiments. As shown, the EGW can be used in UMTS communication networks as well. The interfaces used in a 3G UMTS network can include an IuPS interface for communicating with radio network controllers (RNCs), a Gn interface for communicating with an serving GRPS support node (SGSN), and a Gi interface for offloading traffic from the EGW to the Internet. The EGW in providing edge functionalities in a UMTS communication network can include a local GGSN that is used to provide offloads to the Internet at the edge of the network rather than at the traditional core network. As with the EGW in an LTE network, the UMTS EGW can use a channel to communicate with the central GGSN in the core network. The EGW can communicate addressing, policy, QoS, and accounting information to the central GGSN. The EGW can serve as a Iu-PS tunnel terminator for certain services and can provide selected IP traffic offload (SIPTO), where traffic flows from the femtocell to the Internet without traversing the core network.

Figure 18:
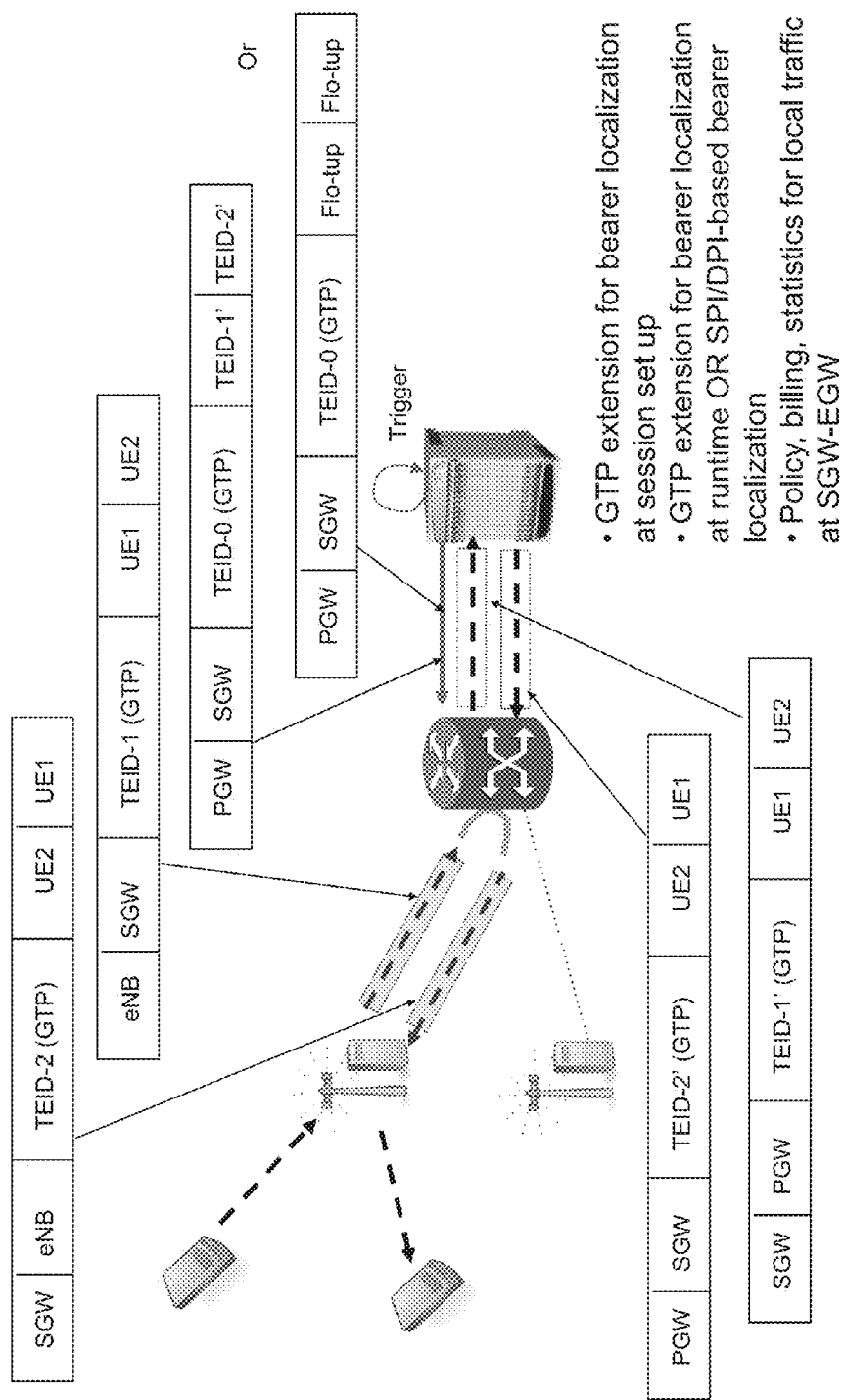
FIG. 18 illustrates messaging information that can be communicated to and from the EGW during traffic localization in accordance with certain embodiments.

FIG. 18 illustrates messaging information that can be communicated to and from the EGW during traffic localization in accordance with certain embodiments. The EGW can communicate eNB address information, SGW address information, GPRS tunneling protocol (GTP) tunnel endpoint identification (TIED) information, and UE information with the RNC. The trigger can occur at the PGW to recognize that localization is possible and the PGW can send the EGW a trigger message that includes information to implement localization for a particular call. The PGW can send either TEIDs to identify the tunnels to bridge or perform TEID switching on or can send tuples of information such as "Flo-tup" for each tunnel. In some embodiments, the system can use a GTP extension for bearer localization at session setup, a GTP extension for bearer localization at runtime, or a shallow packet inspection/deep packet inspection (SPI/DPI) based bearer localization. Policy, billing, and statistics for local traffic can be maintained at the SGW-EGW and the channel to the PGW used in order to manage aspects of the session.

Figure 19:
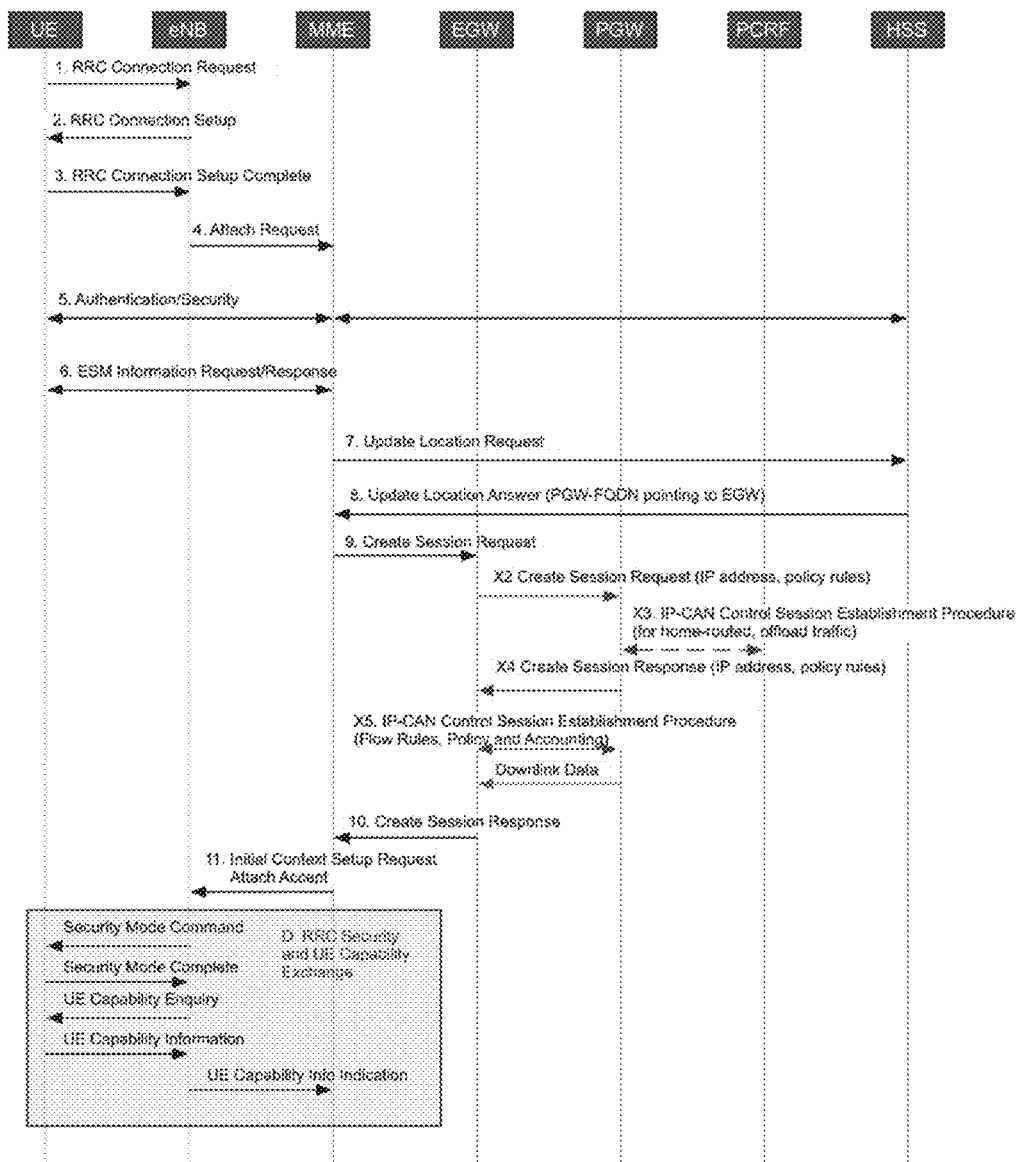
FIGS. 19-20 illustrate a call flow diagram of an UE attach in an LTE network with an EGW in accordance with some embodiments.
Figure 20:
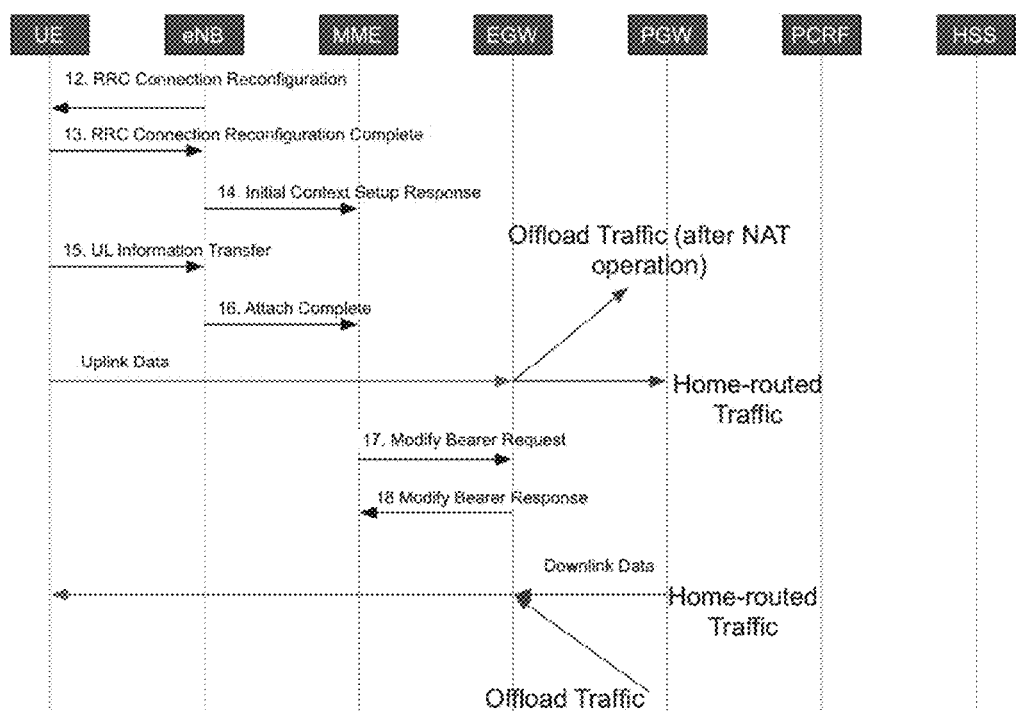

FIGS. 19-20 illustrate a call flow diagram of an UE attach in an LTE network with an EGW in accordance with some embodiments. Many of the steps in FIGS. 19-20 are similar to the steps of FIGS. 4-5 above and are not repeated here. In step 7, the MME sends an update location request message to the HSS. In step 8, the HSS sends an update location answer message to the MME. The update location answer message includes ULA-Flags and subscription data when the result is success. The subscription data includes the profile for the subscribed APNs. In some embodiments, the PGW-FQDN is mapped to the EGW when offload is configured for the APN and the user.

In step 9, the MME resolves the supplied PGW-FQDN that maps to the EGW. The MME sends a Create Session Request message to the EGW to setup a session on the EGW. The create session request message can include information such as IMSI, MSISDN, MEI, ULI, Serving Network, RAT Type, Indication Flags, Sender F-TEID for C-plane, PGW Address for C-plane or PMIP, APN, Selection Mode, PDN Type [IPv6], PAA, Maximum APN Restriction, APN-AMBR, PCO (DNS and P-CSCF addresses), Bearer Contexts [EBI, Bearer QoS, Charging Characteristics]. The PDN Type can be based on the subscription record received from the HSS and the PDN Type information provided by the UE. PDN Type field in the PAA is the same as the PDN Type IE. The IPv6 Prefix and Interface Identifier can be set to ALL-ZERO for PDN Type IPv6. If static assignment is used, the corresponding addresses can be used.

Step X1 (not shown in the Figure) is for the case when it is deemed desirable to expose a policy interface directly from the EGW to the PCRF. In step X1, the Create Session Request is processed by the EGW, which may contact the PCRF for initializing policy rules. i.e., IP-CAN Session Establishment steps take place this at this stage between EGW and PCRF for the offload traffic.

In step X2, the EGW sends a Create Session Request message to the PDN GW in order to establish the new connection. The create session request message can include information such as IMSI, MSISDN (as received on S11 interface), MEI, ULI, Serving Network, RAT type, Indication Flags, Sender F-TEID for Control Plane, APN, Selection Mode, PDN Type, PDN Address Allocation, Max APN Restriction, APN-AMBR, PCO (DNS and P-CSCF addresses), Bearer Contexts to be Created [EPS Bearer ID, Bearer Level QoS, Charging Characteristics, S5/8-U SGW F-TEID], Recovery (conditional on first time contact). This step is used for deriving the UE IP address and the policy configuration for the PDN at the EGW. There are at least two choices for deriving the policy rules and flow filters for offload traffic and home traffic. First, using private extensions in GTPv2 signalling. This has the advantages of in-band signalling, but is not generic and perhaps not easily extensible. Second, using a diameter interface from the EGW to PGW. This would be off-band, but could serve as a generic interface for providing policy and accounting.

In step X3, an IP-CAN Session Establishment Procedure is initiated. The PCEF sends a CC-Request (CCR) Command with CC-Request-Type set to INITIAL_REQUEST. The following attributes can be present: Default-EPS-Bearer-QoS, AN-GW-Address, Called-Station-Id (APN-Name), [Event-Report-Indication], 3GPP-User-Location-Info, IP-CAN Type, RAT Type, Framed-IPv6-Prefix, Subscription-Id (IMSI), Access-network-Charging-identifier-Gx, Offline, Network-Request-Support, [QoS-Information] User-Equipment-Info, Subscription-Id and base AVP's. The subscribed APN-AMBR can be included in the QoS-information AVP. On receiving the CCR the PCRF can send a CC-Answer (CCA) Command to install the PCC rules and event triggers. CCA includes the following AVPs: Default-EPS-Bearer-QoS, Bearer-Control-Mode, [Event-trigger (subscribe to user location change (eCGI or/and TAI (Event-Trigger=USER_LOCATION_CHANGE (13)), subscribe to serving gateway change (Event-Trigger=AN_GW_CHANGE (21)), subscribe to OUT_OF_CREDIT (15), subscribe to REALLOCATION_OF_CREDIT (16)), subscribe to IP-CAN_CHANGE (7), subscribe to RAT_CHANGE (2), subscribe to PLMN_CHANGE (4), subscribe to QOS_CHANGE (1), subscribe to DEFAULT_EPS_BEARER_QOS_CHANGE (20)], [QoS-information], and Charging-rule-install are subject to use case. The QoS-Information AVP includes an authorized APN-AMBR. The Charging-rule-install includes the rule to create the dedicated bearer for SIP signalling. The PCC rules and event triggers can include information about offload traffic information.

In step X4, the PGW responds with a Create Session Response message to the Serving GW (component in the EGW). The PDN GW provides IPv6 Prefix. The create session response message can include information such as Cause, PGW S5 Address Control Plane (F-TEID), PDN Address Allocation, APN Restriction, APN-AMBR, PCO (DNS and P-CSCF addresses), Bearer Contexts Created [EPS Bearer ID, S5/8-U PGW F-TEID, Cause, UL TFT, DL TFT (both optional), Bearer Level QoS (optional), Change Reporting Action, Charging ID], Recovery (if contacting for first time). The Create Session Response message includes a private extension which either contains the TFTs to be used for offload, or the private extension simply indicates that the EGW establish a Diameter session with the PGW (see X5 below). In step X5, when the private extension in the Create Session Response message includes an indication to establish a Diameter session, the EGW initiates an IP-CAN session establishment procedure with the PGW. The resulting Diameter session serves as a channel for communication between EGW and PGW for policy and accounting purposes. In step 10, the EGW sends a create session response message to the MME.

In FIG. 20 the EGW can offload uplink traffic and/or downlink traffic that is received at the EGW. The EGW selects traffic for offload based on offload logic as described above in the offload section.

Figure 21:
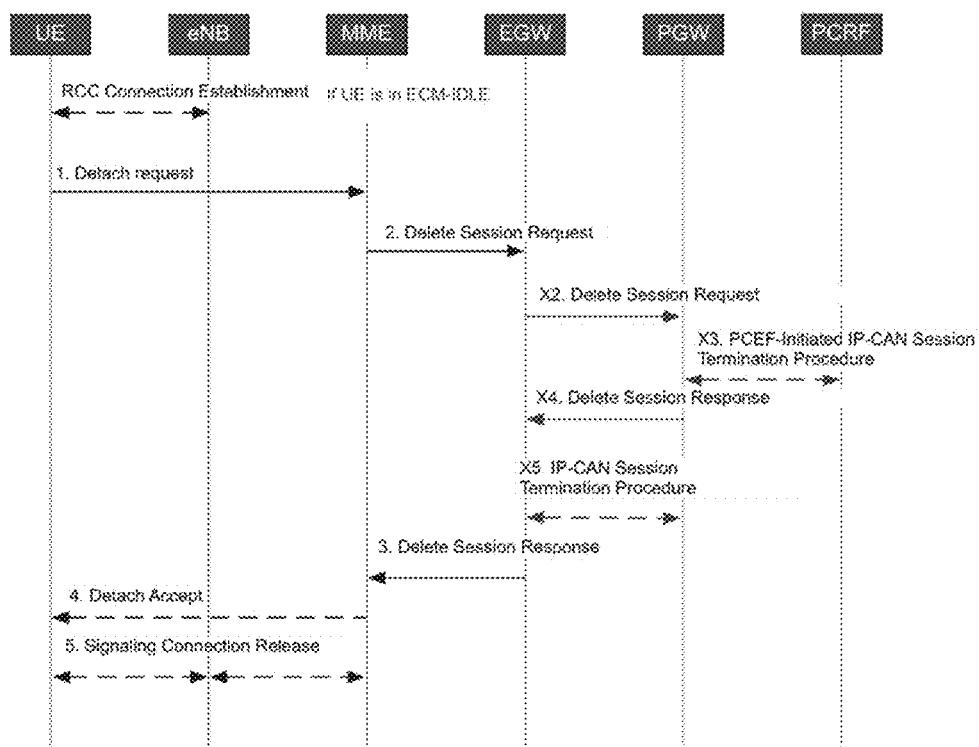
FIG. 21 is a call flow diagram of a UE-initiated detach procedure with and EGW in accordance with certain embodiments.

FIG. 21 is a call flow diagram of a UE-initiated detach procedure in accordance with certain embodiments. Many of the steps in FIG. 21 are similar to the steps of FIG. 6 above and are not repeated here. In step 2, the MME sends a delete session request message to the EGW. The delete session request message can include information such as LBI, ULI, Indication Flags [Operation Indication=1]. Step X1 (not shown) can be used when a direct PCRF interface is enabled on the EGW to performs PCEF-initiated IP-CAN session termination procedure with the PCRF. In step X2, the EGW sends a Delete Session Request message (including LBI and ULI) to the PGW to delete the session at the PGW.

In step X3, the PGW sends a CC Request (CCR) message with CC-Request-Type AVP set to TERMINATION_REQUEST. The PCRF responds with CC Answer (CCA) message. In step X4, the PGW sends Delete Session Response (including cause) to the EGW (e.g., the SGW-EGW). The Delete Session Response serves as a trigger for the EGW to release the Diameter session with the PGW. Prior to releasing the session, the EGW exports the accounting records to the PGW. In step X5, the EGW releases the IP-CAN session with the PGW. As a part of this procedure, the EGW exports the accounting records for the UE. In step 3, the EGW sends Delete Session Response (including cause) to the MME.

Figure 22:
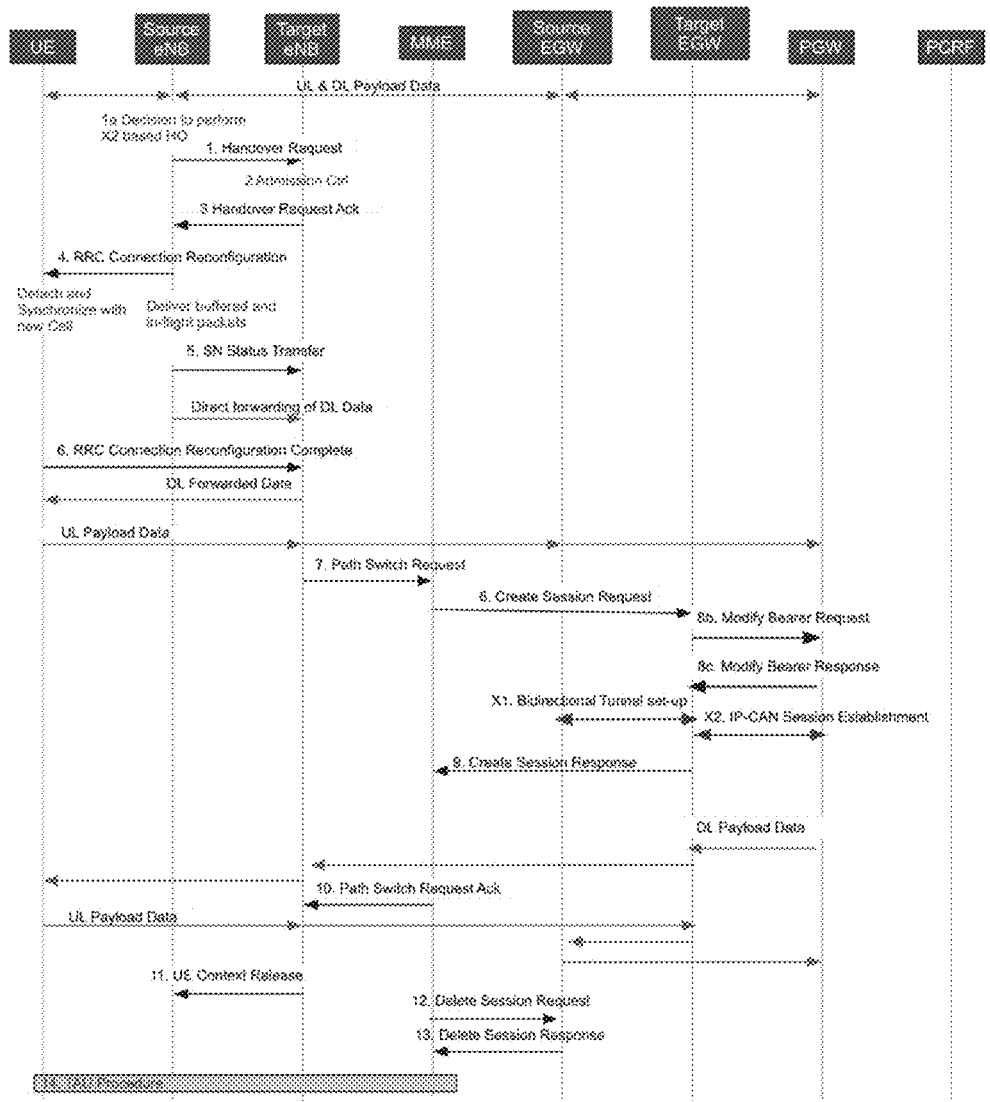
FIG. 22 illustrates an EGW relocation call flow with and EGW in accordance with certain embodiments.

FIG. 22 illustrates an EGW relocation call flow in accordance with certain embodiments. When there is no EGW relocation, the current EGW continues to serve the UE traffic without any additional procedures. For the MME, the EGW relocation appears as an SGW relocation. When there is SGW relocation, there are three possible scenarios. First, the target SGW is part of the EGW itself. The configuration of TAI-FQDN results in this scenario when an operator is interested in traffic offload at the edge. Second, the target SGW is a general-purpose SGW. This can happen in mixed-mode deployments, and is not assured to provide offload at the edge (depending on the exact location of the SGW). Such mixed-mode deployments ensure fallback to the normal mode of operation (without offload) since the target SGW is unaware of offload functionality. Third, the target SGW is part of the EGW itself, and the PGW is part of the anchor (source) EGW. This can happen in dedicated offload APN deployments where the MME chooses the combined SGW and PGW as the EGW.

For scenario 1, the target SGW needs to understand how to forward traffic, i.e., which traffic needs to be sent on S5 and which traffic is to be sent for offload. The target SGW that is also an EGW sends a private extension in the Modify Bearer Request message indicating its EGW functionality. The PGW provides the flow filter rules and the IP address of the anchor (source) SGW as private extensions in the Modify Bearer Response message. Subsequently, the target SGW can initiate establishing a bidirectional tunnel with the anchor SGW. This tunnel can be used for carrying offload traffic between the two SGWs. The target SGW uses the flow filter information received from the PGW to decide which traffic needs to be sent over the bidirectional tunnel and which traffic needs to be sent over the S5 interface to the PGW directly.

For scenario 2, new extensions to the existing standard mechanism are proposed when offload session persistence is desired. The standard way to accomplish this is by using the Indirect Data Forwarding (IDF) procedure for the bearer(s) that need offload treatment. However, the IDF is defined only for S1 handovers, and for downlink traffic only. With the proposed mechanism, the IDF can be extended to provide the forwarding support for both uplink and downlink traffic, as well as for X2 handovers as well. With IDF, the MME establishes inter-SGW tunnel for the specified bearer, allowing all traffic to traverse the anchor SGW. Since the NAT session for the offload is at the anchor EGW, the IDF enables the traffic to traverse the anchor EGW, thus providing session persistence for the offload traffic as well. The bearers which are not subject to IDF can be forwarded on S5 directly. When NAT session persistence is not required, the IDF can be turned off.

In the absence of extensions to IDF for scenario 2, the traffic from the target SGW reaches PGW. The PGW forwards traffic to the Internet. This is the normal mode of operation in the LTE/SAE architecture. This can break persistence of any existing offload sessions using the NAT at the anchor SGW. For scenario 3, the target SGW treats anchor EGW as the PGW, and the procedure is the same as the standard procedure.

In FIG. 22, many of the steps are similar to the steps of FIG. 7 and are not repeated here. In step 8, the MME selects a new SGW co-located with the EGW. For this, the SGW selection based on TAI-FQDN can ensure that the order in the NAPTR records for the new SGW-EGW is lower than for all other SGWs that serve the TAI. And, if the order value is the same, the preference value for the new SGW-EGW is the lowest. The lower order and preference values can ensure that the MME selects the SGW-EGW for traffic offload during relocation. The MME sends a Create Session Request message to the target EGW in order to setup a session on the target EGW. The create session request message can include information such as IMSI, ULI, Serving Network, RAT Type, Indication Flags, Sender F-TEID for C-plane, PGW Address for C-plane or PMIP, APN, PDN Type, Maximum APN Restriction, LBI, Bearer Contexts [EBI, S1-U eNB F-TEID, S5/S8-U PGW F-TEID, Bearer QoS, and Charging ID].

In step 8b, the Target SGW-EGW sends a modify bearer request message to the PGW, and includes an indication in a private extension that it is capable of EGW functionality. In step 8c, the PGW sends a modify bearer response message to the SGW-EGW, and provides the flow filters and the IP address of the anchor SGW-EGW in private extensions. In step X1 a Bidirectional Tunnel is setup. Using the information received in the modify bearer response message, the target SGW-EGW, sends a tunnel initiate request message to the anchor SGW-EGW. The anchor SGW-EGW responds with a tunnel initiate response message. The result of this message exchange is establishment of a bidirectional tunnel that allows offload traffic to traverse the anchor SGW-EGW. If there are no existing NAT sessions at the anchor SGW-EGW, then no tunnel is established and the target SGW-EGW begins to act as the new anchor for the offload traffic.

When the PDN is deleted at the target SGW-EGW, the target SGW-EGW initiates tunnel terminate request message to the anchor SGW-EGW which responds with tunnel terminate response message. Subsequently, the tunnel is torn down. Indirect Data Forwarding (IDF) procedure with extensions can be used in mixed-mode scenarios where the target SGW does not provide the offload functionality. The MME establishes an inter-SGW tunnel as a standard procedure providing the bearers to be used for IDF. Based on the operator configuration, the default bearer may be configured to be provided for the IDF, and the traffic belonging to the default bearer is then subject to IDF. In this case, the offload traffic remains anchored at the anchor SGW-EGW.

In step X2, the Modify Bearer Response message serves as a trigger for SGW-EGW to establish a Diameter session with the PGW. The SGW-EGW can use the Diameter session to obtain the policy and flow filters, and can use the Diameter session to export the accounting information. An alternate embodiment to obtaining the flow filters via Diameter session is to use bearer-level offloading via the Indirect Data Forwarding (IDF) procedure (see below). In step 9, the EGW sends a Create Session Response message to MME. The create session response message can include information such as cause, Sender F-TEID for Control Plane, APN Restriction, Bearer Contexts Created [EPS Bearer ID, Cause, S1-U SGW F-TEID].

In step 12, if there are active bearer contexts for the UE, the MME sends delete session request message (including LBI and Indication Flags) to the source SGW-EGW. The Operation Indication flag may not be set. In step 13, the source SGW-EGW verifies if there is any offload session it is anchoring. If yes, it continues to maintain the offload session. It deletes any other session information. The source EGW sends delete session response message (including cause) to the MME.

Figure 23:
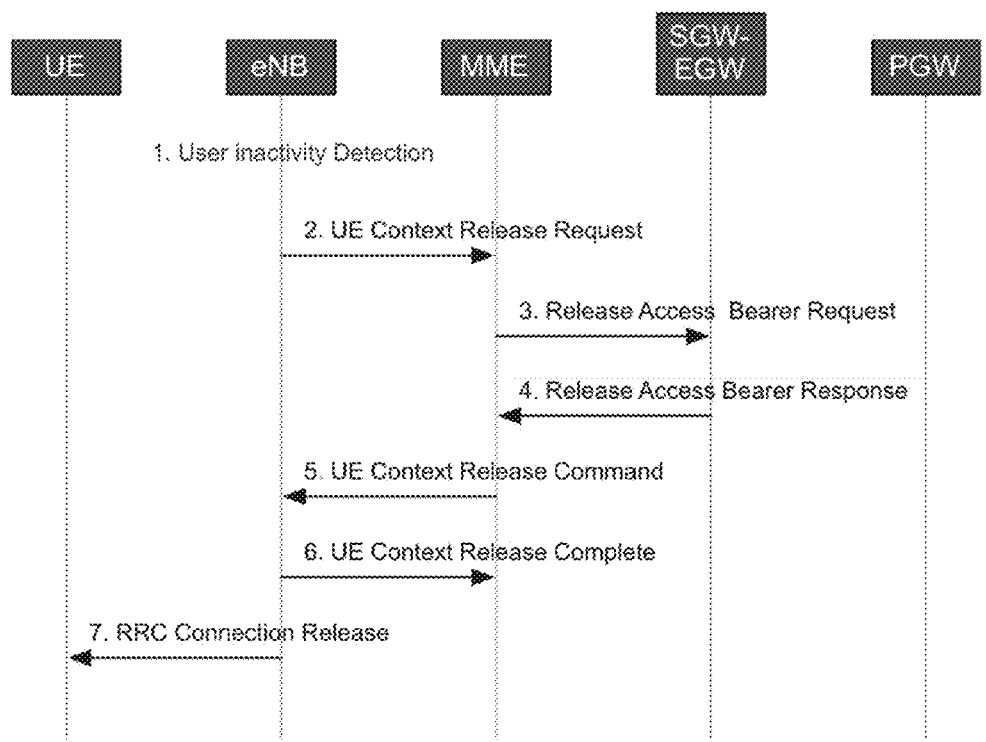
FIG. 23 illustrates an active to idle UE transition with and EGW in accordance with certain embodiments.

FIG. 23 illustrates an active to idle UE transition in accordance with certain embodiments. In FIG. 23, many of the steps are similar to the steps of FIG. 8 and are not repeated here. In step 3, the MME informs the SGW-EGW that the UE is not available for DL traffic by sending a release access bearers request message to the SGW. In step 4, the SGW-EGW releases the S1-U eNodeB information for the EPS bearers of that UE and sends a release access bearers response message to the MME.

Figure 24:
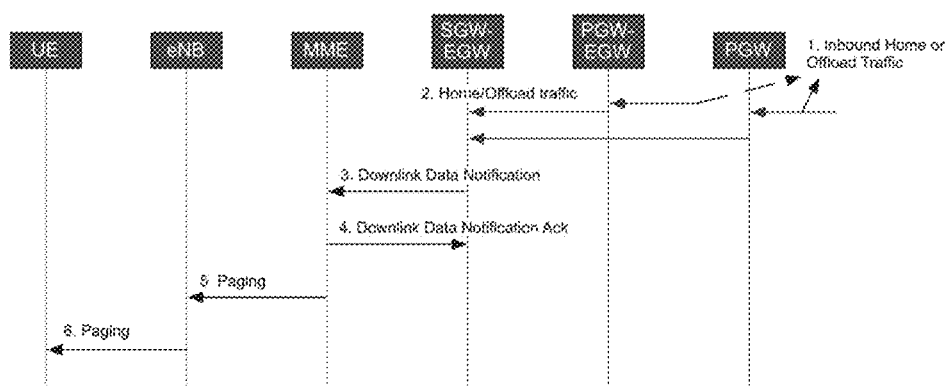
FIG. 24 illustrates paging with and EGW in accordance with certain embodiments.

FIG. 24 illustrates paging in accordance with certain embodiments. If the PGW-EGW receives (offload) traffic for the UE or the PGW receives (home) traffic for the UE, the traffic is forwarded to the SGW-EGW which informs the MME to page the UE. Many of the steps in FIG. 24 are similar to the steps of FIG. 9 and are not repeated here. In step 1, either the PGW-EGW or the home PGW or both may receive data for the UE. In step 2, this data is forwarded to the SGW-EGW. In step 3, the SGW-EGW notifies the MME of incoming (downlink) data by sending the Downlink Data Notification message to the MME. In step 4, the MME acknowledges this by sending the Downlink Data Notification Acknowledge message to the SGW with the Cause IE set to "Request accepted". The downlink data notification acknowledge message can include information such as cause, Recovery (if contacting peer for the first time)) message to the SGW with the Cause IE set to "request accepted".

Figure 25:
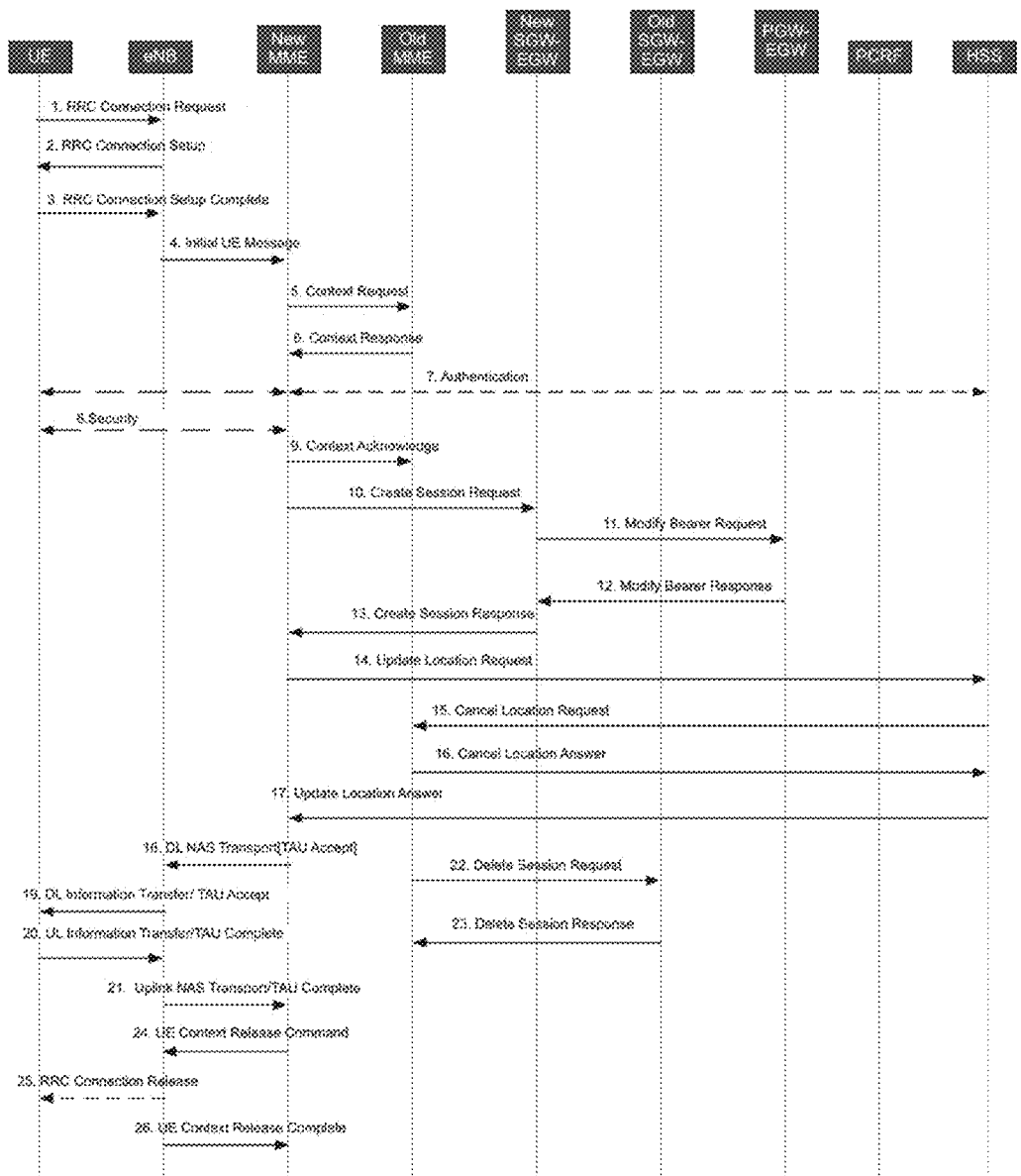
FIG. 25 illustrates updating idle mode mobility with and EGW in accordance with certain embodiments.

FIG. 25 illustrates updating idle mode mobility in accordance with certain embodiments. Many of the steps in FIG. 25 are similar to the steps of FIG. 10 and are not repeated here. In step 10, the MME sends a create session request message to the New SGW-EGW. The create session request message can include information such as IMSI, MSISDN, MEI, ULI, RAT Type, Indication Flags, Sender F-TEID for C-plane, PGW Address for C-plane or PMIP, APN, PDN Type, PAA, Maximum APN Restriction, LBI, Bearer Contexts [EBI, Bearer QoS, Charging Characteristics], Recovery (if contacting peer for first time). In step 11, the new SGW-EGW sends a modify bearer request message to the PGW-EGW. The modify bearer request message can include Sender F-TEID for Control Plane, ULI, Bearer Contexts to be modified [EPS Bearer ID; S5/S8-U SGW F-TEID].

Steps A1-A2 are optional steps that occur if a direct PCRF interface is enabled to the PGW-EGW. In step A1, the PGW-EGW sends a CCR based on the trigger type to the PCRF. The CCR can include information such as Session-Id, CC-Request-Type=UPDATE, Event-Trigger values (USER_LOCATION_CHANGE, AN_GW_CHANGE), User Location Info (new TA), AN-GW-Address. The PGW-EGW includes the applicable event triggers and corresponding data based on the event triggers to which the PCRF had subscribed. In optional step A2, the PCRF responds with CCA message for the bearer. The CCA message can include information such as Session-Id, Result-Code, CC-Request-Type=UPDATE, [Charging-Rule-Install], [Charging-Rule-Remove], [QoS-Information], [Event-Triggers].

In step 12, the PGW-EGW responds with a Modify Bearer Response message to the SGW. The modify bearer response message can include information such as cause, MSISDN, Bearer Contexts Modified [EBI, Cause]. In step 13, the SGW-EGW responds with a Create Session Response message to the MME. The create session message can include information such as cause, Change Reporting Action, PGW S5 Address Control Plane (F-TEID), APN Restriction, APN-AMBR (if modified by the PCRF), Bearer Contexts Created [EPS Bearer ID, S1-U SGW F-TEID, S5/S8-U PGW F-TEID, Cause, UL TFT, DL TFT (both optional), Bearer Level QoS (optional), Charging ID].

The deletion of the session, which takes place in steps 22 and 23 can take place any time after step 16. In step 22, since the old MME receives a SGW Change Indication (in Context Acknowledge message), the old MME sends a Delete Session Delete Session Request (including LBI and Indication Flags) to the old SGW-EGW (when there are any active bearers). The Operation Indication flag may not be set. In step 23, the Old SGW-EGW responds with Delete Session Response (Cause) to the Old MME.

The EGW can implement the following functions. A GRPS tunneling protocol version 2 (GTPv2) control plane functionality with the ability to operate on the S11 interface. A GRPS tunneling protocol user data tunneling (GTP-U) for operating on the S1-U interface. Diameter functions whose attribute value pairs (AVPs) can be carried either in the GTPv2 control plane messages or via Diameter message proxying. A function to provide accounting and charging data generation. A network address translation (NAT) operation for offloading packets or traffic to and from the Internet. These are largely SGW functions, but include some PGW functions such as packet forwarding over the SGi interface. In some embodiments, the EGW can be implemented as including an SGW function and a proxy PGW or lightweight PGW function that provides limited PGW functionality and uses a channel to work with the central or home PGW functionality.

The GTPv2 control plane functionality can include a number of abilities or tasks. For example, resolving the APN in the create session request message received from the MME into an APN-FQDN that points to a home PGW. Initiating a create session request message to the home PGW and processing a create session response from the home PGW. Starting a subscriber session using the IP address and policy rules. This involves an internal S5 signaling with the co-located PGW. The policy rules may be sent in-band in GTPv2 signaling or off-band using Diameter message proxying. Supporting a modify bearer request and modify bearer response messages for X2 and S1 handovers. Supporting context transfers and forwarding protocol between EGWs for handovers involving EGW relocation. Propagating modify bearer request to home PGW when ULI reporting is enabled. Supporting downlink data notification/acknowledgment/failure indication messages (for paging). Supporting release access bearer request/response for active to idle transition (S1-U Release procedure). Supporting delete session request and delete session response message for LTE Detach operation. Supporting update bearer request and update bearer response messages from the home PGW to change bearer forwarding features.

The GTP-U functionality implemented by the EGW can include a number of abilities or tasks such as terminating the S1-U tunnel from the eNB, GTP-U encapsulation and decapsulation, and other user plane operations. The Diameter functions can be implemented in at least one of two ways. First, the GTP messages on the channel interface between the EGW and home PGW include the Diameter policy attributes. For example, the create session response message from the home PGW includes the (proxied) IP-CAN Session Establishment attributes (selected attributes from the CCA message). Second, the EGW runs a separate Diameter service protocol which initiates the IP-CAN Session Establishment procedure using CCR message to the PGW, and the PGW responds with the proxied CCA message.

The EGW can provide a number of accounting and charging data records generation functions. For example, the EGW can support Diameter-based (Rf interface) and/or GTPP-based (Gz interface) charging, per-UE charging records, per-PDN charging records, per-UE-per-QCI records, per-PDN-per-QCI records, and per-bearer charging (Gz), for example.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The offload gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 26:
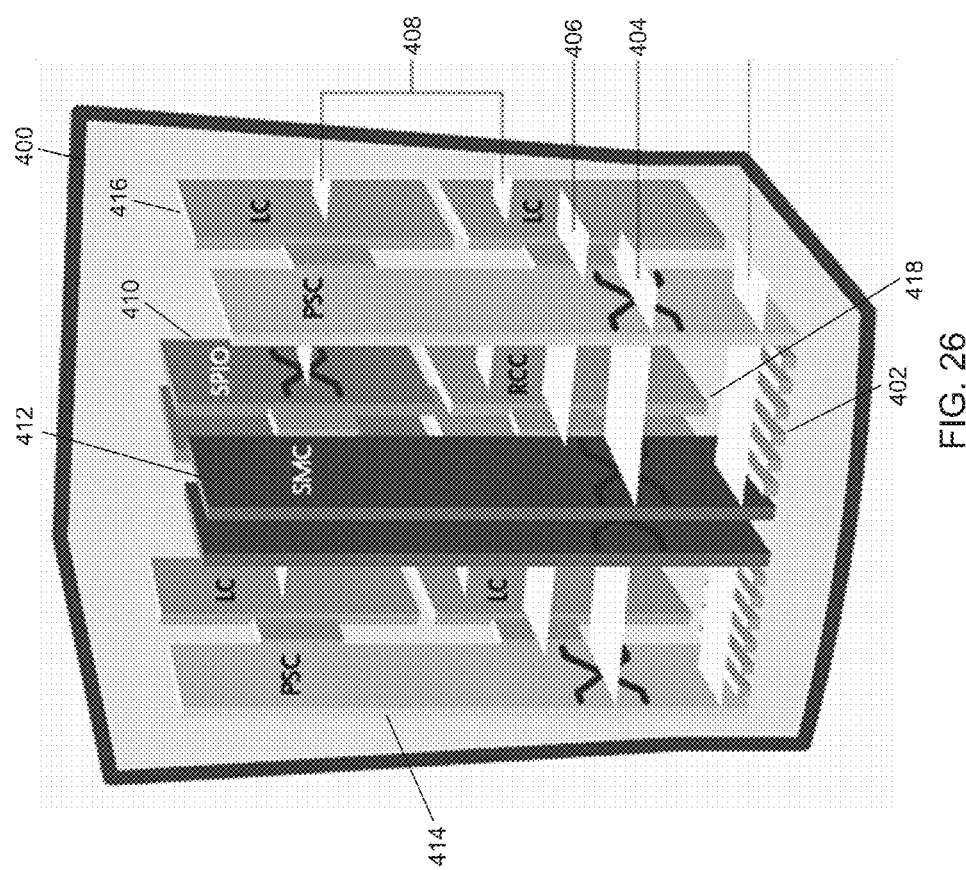
FIG. 26 illustrates a network device configuration in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 26 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 27:
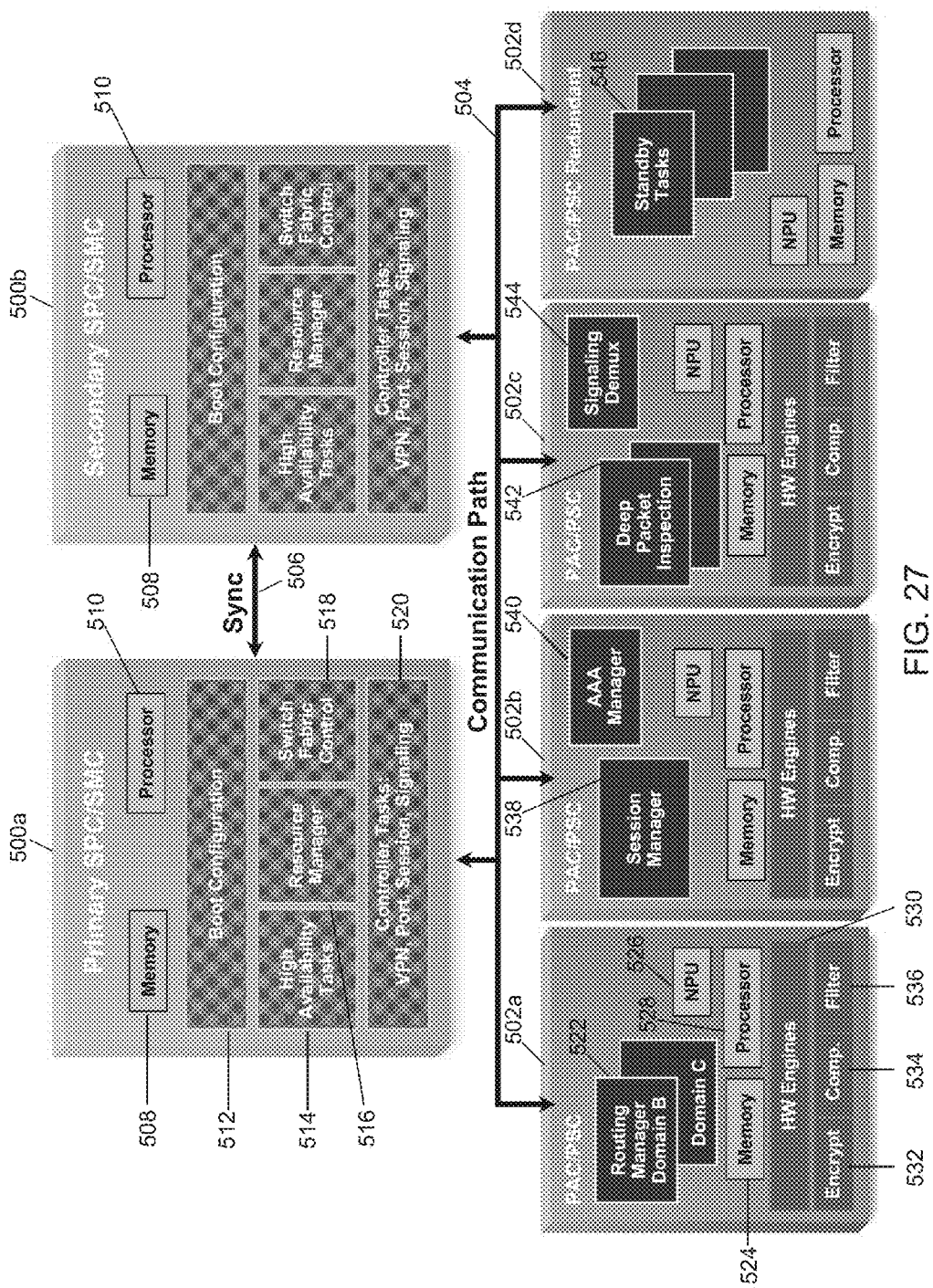
FIG. 27 illustrates an architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 27 illustrates a logical view of the software architecture of a network device in accordance with certain embodiments. As shown, the software and hardware can be distributed within the network device and across different circuit boards, processors, and memory. FIG. 27 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. A gateway comprising:
    one or more interfaces configured to provide packet communication with a user equipment, a packet core network, and an Internet, wherein the one or more interfaces are further configured to communicate with a home gateway in the packet core;
    a processor, in communication with the one or more interfaces, configured to inspect a control plane message received from the home gateway, wherein inspection of the control plane message comprises using an analyzer to determine offload eligibility of traffic corresponding to the received control plane message and call localization eligibility of traffic corresponding to the received control plane message,
    wherein the traffic corresponding to the received control plane message is identified as eligible to be offloaded from the packet core network to the Internet to bypass the packet core network upon determining that one or more trigger conditions is satisfied;
    wherein the traffic corresponding to the received control plane message is identified as eligible for call localization within the home gateway upon determining that a source device and a destination device of the traffic are serviced by a same radio access network;
    a network address translation functionality that is configured to modify packets associated with the traffic corresponding to the received control plane message such that the packets are routed through the Internet, bypassing the packet core network; and
    a call localization functionality that is configured to change information of packets associated with traffic selected for call localization to localize the traffic at the gateway.

2. The gateway of claim 1, wherein the one or more interfaces include a channel and the home gateway includes a packet data network gateway (PGW) that is configured to receive addressing and accounting information over the channel for call localization operations and offloading operations that occur on the gateway.

3. The gateway of claim 1, further comprising a serving gateway (SGW) functionality that is configured to establish packet data network (PDN) connections and to identify the traffic for offload.

4. The gateway of claim 3, wherein the SGW functionality is configured to communicate over the one or more interfaces with the home gateway to obtain centralized information to manage subscriber sessions.

5. The gateway of claim 4, wherein the gateway maintains a session for a subscription when moving traffic from a first radio access technology to a second radio access technology.

6. The gateway of claim 1, wherein the call localization functionality is configured to receive a packet from a first user equipment on a first tunnel with a first tunnel identifier and to switch the first tunnel identifier of the packet to a second tunnel identifier and sending the packet to a second user equipment.

7. The gateway of claim 1, wherein the one or more interfaces include an S1-U interface for communicating with an evolved nodeB (eNB), an S5 interface, and a SGi interface.

8. The gateway of claim 1, wherein the processor is configured to run a module that is configured to perform a shallow inspection of packets to determine offload eligibility of the packets, wherein the shallow inspection of packets includes an inspection of Layer 3 or Layer 4 of the packets.

9. The gateway of claim 8, wherein the processor is configured to run a module that is configured to perform a deep inspection of packets to determine offload eligibility of the packets, wherein the deep inspection of packets includes an inspection of Layer 7 of the packets.

10. The gateway of claim 9, wherein the module is configured to perform the deep inspection of the packets to determine the offload eligibility of the packets when the shallow inspection of the packets does not provide enough information to determine the offload eligibility.

11. The gateway of claim 1, wherein the received control plane message includes a PDP context request message, and wherein the module is further configured to load balance the PDP context request message to a session manager if the PDP context request message is offload eligible,
    inspecting, by the gateway, the control plane message, wherein inspection of the control plane message comprises using an analyzer to determine offload eligibility of traffic corresponding to the received control plane message and call localization eligibility of traffic corresponding to the control plane message,
    wherein the traffic corresponding to the control plane message is identified as eligible to be offloaded from a packet core network to an Internet to bypass the packet core network upon determining that one or more trigger conditions is satisfied;
    wherein the traffic corresponding to the received control plane message is identified as eligible for call localization within the home gateway upon determining that a source device and a destination device of the traffic are serviced by a same radio access network.

12. A method comprising:
receiving a control plane message via an interface at a gateway that is bound to or from a user equipment (UE);
inspecting, by the gateway, the control plane message, wherein inspection of the control plane message comprises using an analyzer to determine offload eligibility of traffic corresponding to the received control plane message and call localization eligibility of traffic corresponding to the control plane message,
wherein the traffic corresponding to the control plane message is identified as eligible to be offloaded from a packet core network to an Internet to bypass the packet core network upon determining that one or more trigger conditions is satisfied;
wherein the traffic corresponding to the received control plane message is identified as eligible for call localization within the home gateway upon determining that a source device and a destination device of the traffic are serviced by a same radio access network
if the traffic corresponding to the control plane message is offload eligible, modifying, by a network address translation functionality, packets associated with the traffic to route the traffic onto the Internet to bypass the packet core network;
if the traffic corresponding to the control plane message is eligible for call localization, switching, by the gateway, identifiers of packets associated with the traffic to localize a call session associated with the traffic; and
communicating, by the gateway, information regarding the call localization or the offloading over a channel to a home gateway.

13. The method of claim 12, wherein the home gateway is a packet data network gateway (PGW) that receives addressing and accounting information over the channel for call localization operations and offloading operations that occur on the gateway.

14. The method of claim 13, further comprising communicating, by the gateway, information with the PGW to manage subscriber sessions centrally.

15. The method of claim 12 further comprising maintaining, by the gateway, a session when moving traffic from a first radio access technology to a second radio access technology where each access technology is served by the gateway.

16. The method of claim 12, further comprising:
receiving, by the gateway, a packet from a first user equipment on a first tunnel with a first tunnel identifier at the gateway; and
switching, by the gateway, the first tunnel identifier of the packet to a second tunnel identifier and sending the packet to a second user equipment.

17. The method of claim 16, wherein the first tunnel is a GPRS tunnel protocol (GTP) user plane tunnel and a serving gateway (SGW) function is used to handover a localized call session from a first evolved nodeB (eNB) to a second evolved nodeB (eNB).

18. The method of claim 12, further comprising:
caching, by the gateway, content at the gateway for a second user equipment (UE); and
streaming, by the gateway, the content over the radio access network from the cache to the user equipment.

19. Logic encoded on one or more non-transitory tangible media for execution and when executed operable to:
receive a control plane message via an interface that is bound to or from a user equipment (UE);
inspect the control plane message, wherein inspection of the control plane message comprises using an analyzer to determine offload eligibility of traffic corresponding to the received control plane message and call localization eligibility of traffic corresponding to the received control plane message,
wherein the traffic corresponding to the received control plane message is identified as eligible to be offloaded from a packet core network to an Internet to bypass the packet core network upon determining that one or more trigger conditions is satisfied;
wherein the traffic corresponding to the received control plane message is identified as eligible for call localization within the home gateway upon determining that a source device and a destination device of the traffic are serviced by a same radio access network
if the traffic corresponding to the control plane message is offload eligible, modify packets associated with the traffic to route the traffic onto the Internet to bypass the packet core network;
if the traffic corresponding to the control plane message is eligible for call localization, switch identifiers of packets associated with the traffic to localize a call session; and
communicate information regarding the call localization or the offloading over a channel to a home gateway.

20. The logic of claim 19, further comprising:
receive a packet from a first user equipment on a first tunnel with a first tunnel identifier at the gateway; and
switch the first tunnel identifier of the packet to a second tunnel identifier and sending the packet to a second user equipment.

* * * * *